United States Patent
Veige et al.

(10) Patent No.: US 12,209,162 B2
(45) Date of Patent: Jan. 28, 2025

(54) CATALYSTS AND METHODS OF POLYMERIZING

(71) Applicant: University of Florida Research Foundation, Inc., Gainesville, FL (US)

(72) Inventors: Adam S. Veige, Gainesville, FL (US); Vineet K. Jakhar, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 616 days.

(21) Appl. No.: 17/607,522

(22) PCT Filed: Apr. 30, 2020

(86) PCT No.: PCT/US2020/030599
§ 371 (c)(1),
(2) Date: Oct. 29, 2021

(87) PCT Pub. No.: WO2020/223426
PCT Pub. Date: Nov. 5, 2020

(65) Prior Publication Data
US 2022/0185950 A1  Jun. 16, 2022

Related U.S. Application Data

(60) Provisional application No. 62/840,694, filed on Apr. 30, 2019.

(51) Int. Cl.
*C08G 61/08* (2006.01)
*C07F 11/00* (2006.01)

(52) U.S. Cl.
CPC ............ *C08G 61/08* (2013.01); *C07F 11/00* (2013.01); *C08G 2261/3324* (2013.01); *C08G 2261/418* (2013.01)

(58) Field of Classification Search
CPC ......... B01J 21/00; B01J 31/00; C08F 4/69215
See application file for complete search history.

(56) References Cited

U.S. PATENT DOCUMENTS

| 10,639,620 B2 | 5/2020 | Veige et al. |
| 11,794,178 B2 * | 10/2023 | Veige ................... B01J 31/2286 |
| 2014/0309389 A1 | 10/2014 | Veige et al. |

FOREIGN PATENT DOCUMENTS

WO  2017/049270 A1  3/2017

OTHER PUBLICATIONS

Fukatsu et al., Hydrodynamic Properties of Flexible-Ring Macromolecules, J. Chem. Phys., 44:4539 (1966).
Gonsales et al., Fast "Wittig-Like" Reactions As a Consequence of the Inorganic Enamine Effect, J. Am. Chem. Soc., 137(14):4840-4845 (2015).
Gonsales et al., Highly Tactic Cyclic Polynorbornene: Stereoselective Ring Expansion Metathesis Polymerization of Norbornene Catalyzed by a New Tethered Tungsten-Alkylidene Catalyst, J. Am. Chem. Soc., 138:4996-4999 (2016).
Hyvl et al., Proof of Tacticity of Stereoregular ROMP Polymers through Post Polymerization Modification, Macromolecules, 48(9):3148-3152 (2015).
International Application No. PCT/US20/30599, International Preliminary Report on Patentability, mailed Nov. 11, 2021.
International Application No. PCT/US20/30599, International Search Report and Written Opinion, mailed Aug. 3, 2020.
Keitz et al., Cis-Selective Ring-Opening Metathesis Polymerization with Ruthenium Catalysts, J. Am. Chem. Soc., 134(4):2040-2043 (2012).
Niu et al., Polypropylene: Now Available without Chain Ends, Chem., 5:237-244 (2019).
Peris et al., Key factors in pincer ligand design, Chem. Soc. Rev., 47:1959-1968 (2018).
Rosebrugh et al., Probing Stereoselectivity in Ring-Opening Metathesis Polymerization Mediated by Cyclometalated Ruthenium-Based Catalysts: A Combined Experimental and Computational Study, J. Am. Chem. Soc., 138(4):1394-1405 (2016).
Rosebrugh et al., Synthesis of Highly Cis, Syndiotactic Polymers via Ring-Opening Metathesis Polymerization Using Ruthenium Metathesis Catalysts, J. Am. Chem. Soc., 135(27):10032-10035 (2013).
Rubio et al., THETA. State, Transition Curves, and Conformational Properties of Cyclic Chains, Macromolecules, 28(7):2240-2246 (1995).
Sarkar et al., An OCO3-Trianionic Pincer Tungsten(VI) Alkylidyne: Rational Design of a Highly Active Alkyne Polymerization Catalyst, J. Am. Chem. Soc., 134(10):4509-4512 (2012).

* cited by examiner

*Primary Examiner* — Fred M Teskin
(74) *Attorney, Agent, or Firm* — MARSHALL, GERSTEIN & BORUN LLP

(57) ABSTRACT

Provided herein are catalysts for polymerization of alkenes to cyclic poly(alkenes), and methods of making and using the same.

20 Claims, 2 Drawing Sheets

CATALYSTS AND METHODS OF POLYMERIZING

CROSS-REFERENCE TO RELATED APPLICATIONS

This application is the U.S. national phase application of PCT Application No. PCT/US20/30599, filed Apr. 30, 2020, which claims the benefit under 35 U.S.C. 119 (e) of U.S. Provisional Application No. 62/840,694, filed Apr. 30, 2019, the entire disclosures of which are hereby incorporated by reference.

STATEMENT OF US GOVERNMENT SUPPORT

This invention was made with government support under Grant No. 1565654 and Grant No. 1856674, awarded by the National Science Foundation. The government has certain rights in the invention.

BACKGROUND

An important challenge in modern polymer chemistry is the efficient and controlled synthesis of polymers with unique topologies. Catalytic ring expansion metathesis polymerization (REMP) is an efficient method for producing cyclic polymers from cyclic monomers. REMP requires the catalyst to contain a tethered metal-carbon double bond, where the growing polymer chain remains attached to the catalyst at two points. Imparting stereoregularity within polymers is critical to manipulating their bulk properties, but controlling the topology (cyclic vs linear) and stereochemistry (atactic, isotactic, syndiotactic, cis/trans, 1,2 versus 2,1 insertion) of polymers is a challenging endeavor.

SUMMARY

Provided herein are catalysts, methods of making the catalysts and methods of preparing polymers. More particularly, provided are transition metal catalysts and their use in preparing cyclic polymers via REMP.

In one aspect, the disclosure provides catalysts having a structure represented by formula (I), formula (II), or formula (III):

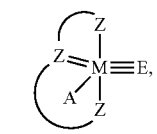  (I)

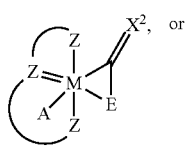  (II)

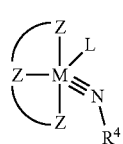  (III)

wherein M is a transition metal; A is selected from the group consisting of $NH_3$, $N(R^3)_3$, $Ar^1$, $C_1$-$C_6$ hydroxyalkyl, $R^3OR^3$, $P(R^3)_3$, $R^3CHO$, $R^3COR^3$, $R^3COOR^3$, and $S(R^3)_2$, each $R^3$ is independently $C_1$-$C_{22}$ alkyl or $Ar^1$, or two $R^3$, together with the atoms to which they are attached, form a five- to eight-member heterocycle; L is a ketene; E is $NR^4$ or S, wherein $R^4$ is $C_1$-$C_{22}$ alkyl or $Ar^1$; Z-Z-Z comprises a tridentate ligand having a structure of

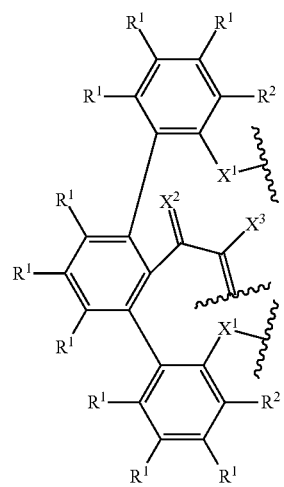

when the catalyst has a structure of Formula (I),

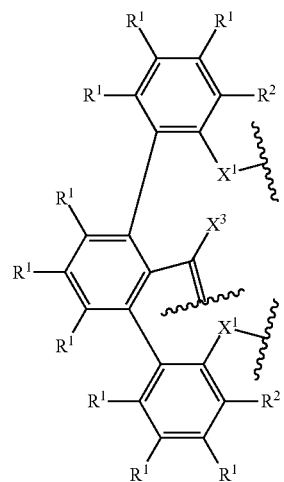

when the catalyst has a structure of Formula (II), or

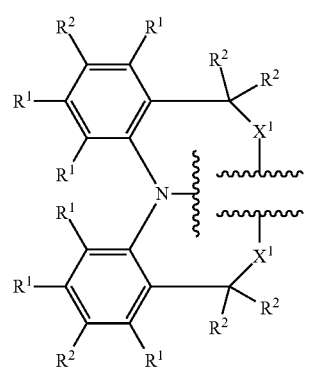

or

-continued

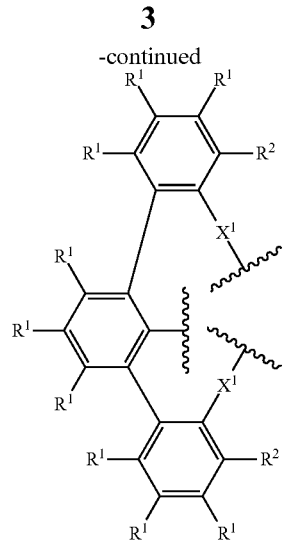

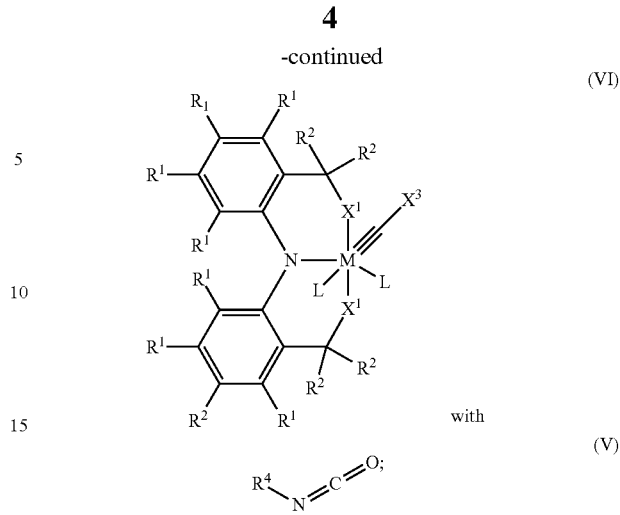

with (V)

$R^4\diagdown_N\diagup^{C=O}$;

wherein each L is independently absent or selected from phosphine, phosphite, phosphonite, phosphinite, amine, amide, imine, alkoxy, ether, thioether, and a five- or six-membered monocyclic group having 1 to 3 ring heteroatoms; or both L together comprise a bidentate ligand.

Other aspects of the disclosure include a method of preparing a cyclic polymer. The method comprises admixing a plurality of alkenes in the presence of the catalysts disclosed herein under conditions sufficient to polymerize the plurality of alkenes, thereby forming the cyclic polymer, wherein the cyclic polymer ring comprises alkene groups.

DETAILED DESCRIPTION

Figure 1:
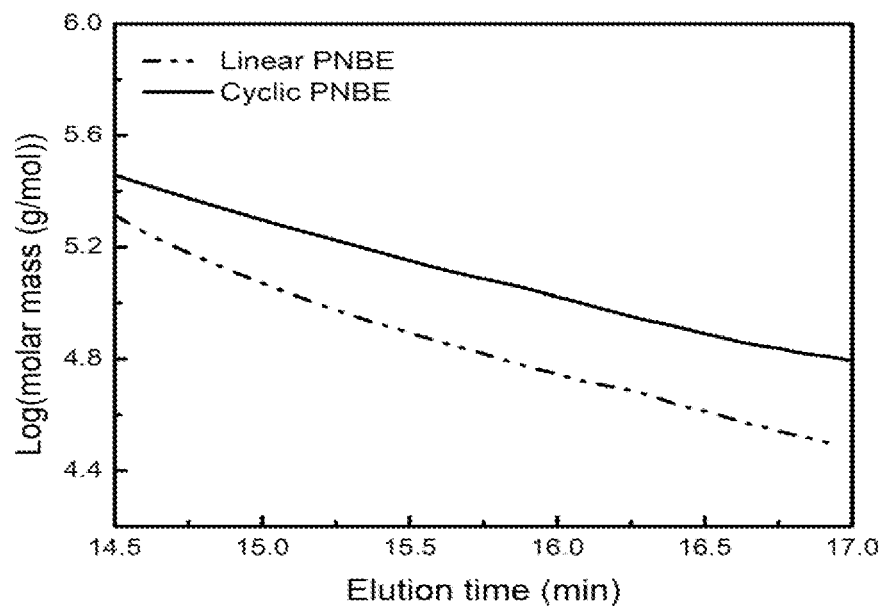
FIG. 1 depicts a graph of the Log of $M_w$ versus elution volume for cyclic poly(norbornene) synthesized by 6-NPh and linear poly(norbonene) synthesized by 15.

Provided herein are catalysts, methods of making said catalysts, and methods of preparing cyclic polymers. These catalysts can be used in the preparation of cyclic polymers via ring expansion metathesis polymerization (REMP).

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is to describe particular aspects only and is not intended to be limiting. As used in the specification and the claims, the term "comprising" can include the aspect of "consisting of." Unless defined otherwise, all technical and scientific terms used herein have the same meaning as commonly under-when the catalyst has a structure of formula (III); each $X^1$ is independently O, $NR^5$, or S, and $R^5$ is $C_1$-$C_{22}$alkyl, $C_5$-$C_8$cycloalkyl, or $Ar^1$; $X^2$ is O, $NR^6$, or S, and $R^6$ is $C_1$-$C_{22}$ alkyl, $C_5$-$C_8$cycloalkyl, or $Ar^1$; each $R^1$ is independently selected from H, $C_1$-$C_{22}$ alkyl, $C_5$-$C_8$cycloalkyl, carboxyl, ester, amino, thiol, halo, $C_1$-$C_{22}$ haloalkyl, and OH, or two adjacent $R^1$, together with the carbon atoms to which they are attached, can form a five to eight-membered cyclic group; each $R^2$ is independently selected from H, $Ar^1$, $C_1$-$C_{22}$ alkyl, $C_5$-$C_8$cycloalkyl, halo, $C_1$-$C_{22}$ haloalkyl, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —O—($C_1$-$C_{22}$ alkyl), and ($R^2$)$_3$—Si—; $X^3$ is selected from $Ar^1$, $C_1$-$C_{22}$ alkyl, $C_5$-$C_8$cycloalkyl, $C_1$-$C_{22}$ haloalkyl, and H; and each $Ar^1$ is independently selected from $C_6$-$C_{22}$ aryl or a 5-12 membered heteroaryl comprising from 1 to 3 ring heteroatoms selected from O, N, and S.

Further provided herein are methods of making said catalysts disclosed herein comprising reacting a complex of formula (IV) or formula (VI) and $CS_2$ or an isocyanate having a structure of formula (V) under conditions sufficient to form the catalyst:

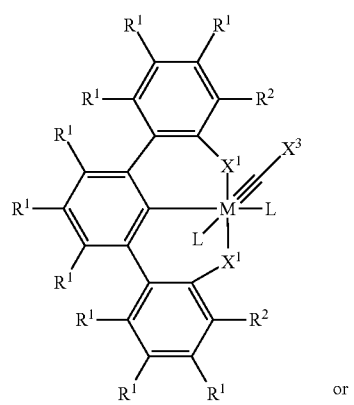

or stood by one of ordinary skill in the art to which the disclosed compositions and methods belong. In this specification and in the claims which follow, reference will be made to several terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events described or in any other order that is logically possible.

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

Catalysts of the Disclosure

The disclosure provides catalysts that can catalyze polymerization reactions. In some cases, the catalysts have a structure represented by formula (I), formula (II), or formula (III):

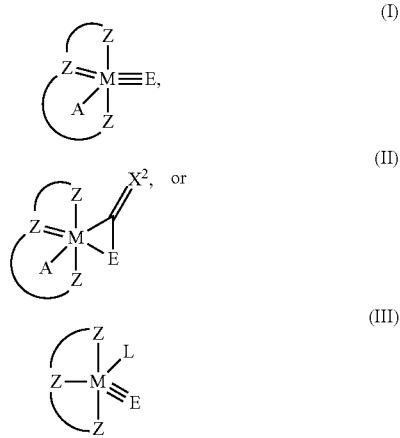

wherein M is a transition metal; A is selected from the group consisting of $NH_3$, $N(R^3)_3$, $Ar^1$, $C_1$-$C_6$ hydroxyalkyl, $R^3OR^3$, $P(R^3)_3$, $R^3CHO$, $R^3COR^3$, $R^3COOR^3$, and $S(R^3)_2$, each $R^3$ is independently $C_1$-$C_{22}$ alkyl or $Ar^1$, or two $R^3$, together with the atoms to which they are attached, form a five- to eight-membered heterocycle; L is a ketene; E is $NR^4$ or S, wherein $R^4$ is $C_1$-$C_{22}$ alkyl or $Ar^1$; and Z—Z—Z comprises a tridentate ligand.

In general, M can comprise a group 6 transition metal. In embodiments, M can be chromium (Cr), molybdenum (Mo), or tungsten (W). In embodiments, M is tungsten.

In general, A can comprise any L-type ligand. L-type ligands are described in detail throughout Gary O. Spessard and Gary L. Miessler, Organometallic Chemistry, published by Oxford University Press, 2010, for example, page 59. In embodiments, A can comprise $NH_3$, $N(R^3)_3$, $Ar^1$, $C_1$-$C_6$ hydroxyalkyl, $R^3OR^3$, $P(R^3)_3$, $R^3CHO$, $R^3COR^3$, $R^3COOR^3$, and $S(R^3)_2$. In embodiments, A can be $N(R^3)_3$, $P(R^3)_3$, $Ar^1$, $S(R^3)_2$ or $R^3OR^3$. In some cases, A can be selected from the group comprising diethyl ether, methyl tert-butyl ether (MTBE), diisopropyl ether, tetrahydrofuran (THF), dioxane and the like. In embodiments, A can be pyridine or derivatives thereof, such as, N,N-dimethylaminopyridine. In embodiments, A can comprise tetrahydrofuran or substituted versions thereof (e.g., substituted with 1-3 $C_{1-6}$ alkyl groups), pyridine or derivatives thereof, or thiophene or substituted versions thereof (e.g., substituted with 1-3 groups selected from $C_{1-6}$ alkyl, halo, CN, and $C_{1-6}$haloalkyl).

Each occurrence of $R^3$ is independently selected from $C_1$-$C_{22}$alkyl, $C_5$-$C_8$ cycloalkyl, or $Ar^1$, or two $R^3$, together with the atoms to which they are attached, form a five to eight-membered heterocycle.

In general, L can comprise a ketene. In embodiments, L comprises a structure having a formula —$C(R^3)$=C=O. In embodiments, the $R^3$ of L can be $C_1$-$C_{22}$ alkyl. In embodiments, the $R^3$ of L can be isopropyl or tert-butyl. In embodiments, the $R^3$ of L can be $C_5$-$C_8$cycloalkyl. In embodiments, $R^3$ of L can be cyclohexyl (Cy). In embodiments, the $R^3$ of L can be $Ar^1$. In embodiments, the $R^3$ of L can be phenyl.

Each occurrence of $Ar^1$ can be independently selected from $C_6$-$C_{22}$ aryl or a 5-12 membered heteroaryl comprising from 1 to 3 ring heteroatoms selected from O, N, and S.

In general, E can comprise $NR^4$ or S. In embodiments, E can be $NR^4$. In embodiments, E can be S. In embodiments, $R^4$ can be phenyl, cyclohexyl, or tert-butyl. In embodiments, E is S and $X^2$ is S.

In general, Z—Z—Z comprises any tridentate ligand. In embodiments, Z—Z—Z comprises a pincer ligand. Pincer ligands as used herein can be defined as tridentate ligands that prefer meridional geometry, and further described in Peris, E. et. al, *Chem. Soc. Rev.*, 2018, 47, 1959-1968. In embodiments, the Z—Z—Z ligand can comprise a tridentate ligand having a structure of

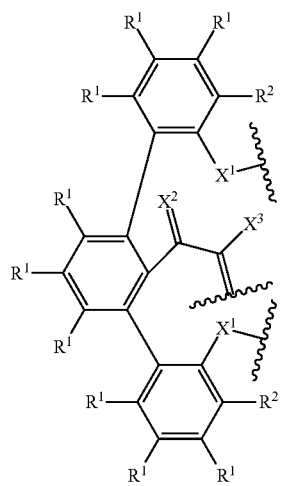

when the catalyst has a structure of formula

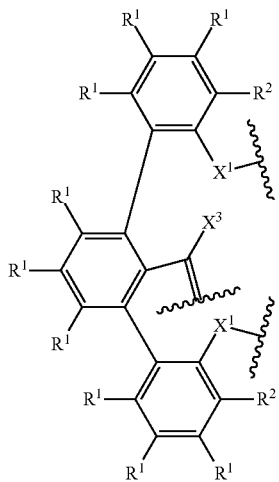

when the catalyst has a structure of formula (II), or

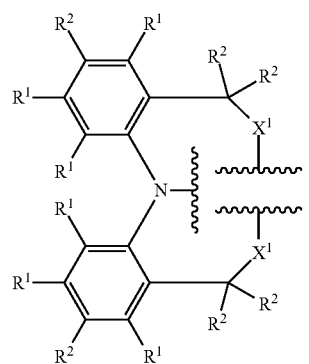

or

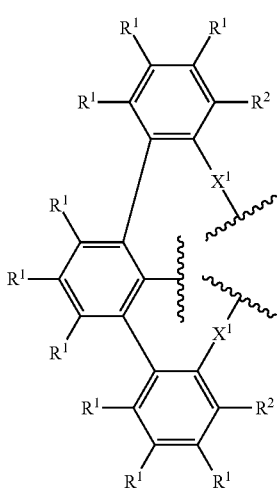

when the catalyst has a structure of formula (III). In embodiments, the catalyst has a structure of formula (I) and the Z—Z—Z ligand comprises

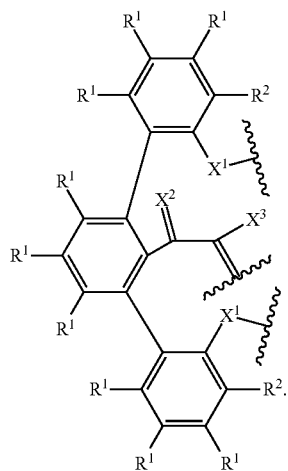

In embodiments, the catalyst has a structure of formula (II) and the Z—Z—Z ligand comprises

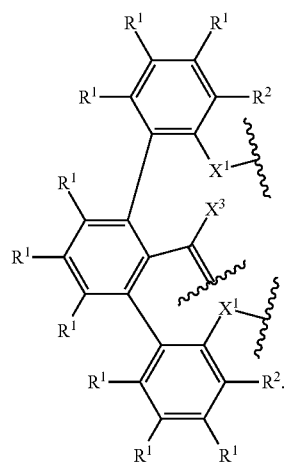

In embodiments, the catalyst has a structure of Formula (III) and the Z—Z—Z ligand comprises

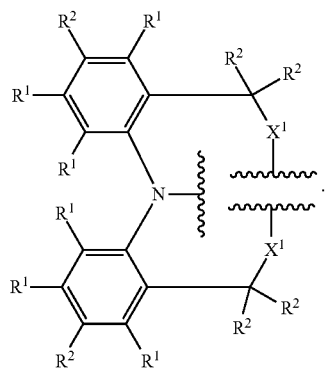

In embodiments, the catalyst has a structure of formula (III) and the Z—Z—Z ligand comprises

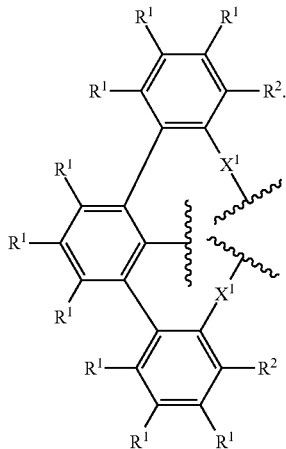

Each occurrence of $X^1$ can be independently O, $NR^5$, or S. In embodiments, $R^5$ can be $C_1$-$C_{22}$ alkyl or $Ar^1$. In embodiments, $X^1$ can be O.

In general, $X^2$ can independently be any heteroatom, such as O, $NR^6$, or S. In embodiments, $X^2$ can comprise O. In embodiments, $X^2$ can comprise $NR^6$. In embodiments, $R^6$ can be $C_1$-$C_{22}$ alkyl or $Ar^1$. In embodiments, $X^2$ can comprise S.

In general, each occurrence of $R^1$ can independently comprise H, $C_1$-$C_{22}$ alkyl, $C_5$-$C_8$ cycloalkyl, carboxyl, ester, amino, thiol, halo, $C_1$-$C_{22}$ haloalkyl, or OH, or two adjacent $R^1$, together with the carbon atoms to which they are attached, form a five- to eight-membered cyclic group. In some cases, each $R^1$ can be H or an alkyl group such as methyl, ethyl, n-propyl, i-propyl, n-butyl, i-butyl, t-butyl, or a larger alkyl group, for example, $C_5$ to $C_{22}$ alkyl. In embodiments, at least one $R^1$ can comprise H. In some embodiments, at least one $R^1$ is $C_1$-$C_6$ alkyl. In some cases, at least one $R^1$ comprises t-butyl. In embodiments, at least two $R^1$ are $C_1$-$C_6$ alkyl. In some cases, at least two $R^1$ comprise t-butyl. In some embodiments, two adjacent $R^1$, together with the carbon atoms to which they are attached, can form a five- to eight-membered cyclic group. Examples of contemplated cyclic groups include cyclopentane, cyclohexane, cycloheptane, cyclooctane, cyclopentene, cyclopentadiene, cyclohexene, cyclohexadiene, cyclohexatriene (benzene), cycloheptene, cycloheptadiene, cycloheptatriene, cyclooctene, cyclooctadiene, cyclooctatriene, and cyclooctatetraene (annulene). In embodiments wherein two adjacent $R^1$ are linked to form a five- to eight-membered cyclic group, one or more of the atoms of the cyclic group can be a heteroatom selected from oxygen, nitrogen, and sulfur.

$R^2$ is generally selected from H, $Ar^1$, $C_1$-$C_{22}$ alkyl, $C_5$-$C_8$cycloalkyl, halo, $C_1$-$C_{22}$ haloalkyl, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —O—($C_1$-$C_{22}$ alkyl), and $(R^3)_3$—Si—. In general, $Ar^1$ is a $C_6$-$C_{22}$ aryl or 5-12 membered heteroaryl group comprising 1 to 3 ring heteroatoms selected from O, N, and S. In embodiments, $R^2$ is selected from methyl, ethyl, propyl, butyl, pentyl, hexyl, naphthyl, and $C_6$-$C_{22}$ aryl. In some cases, $Ar^1$ comprises pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl. $Ar^1$ can also be a fused aryl or heteroaryl group, including, but not limited to, benzofuranyl, isobenzofuranyl, indolyl, isoindolyl, benzothiophenyl, benzimidazolyl, purinyl, indazolyl, benzoxazolyl, benzisoxazolyl, benzothiazolyl, naphthalenyl, anthracenyl, quinolinyl, isoquinolinyl, quinoxalinyl, acridinyl, quinazolinyl, cinnolinyl, and phthalazinyl. In embodiments, $R^2$ is selected from i-butyl; n-butyl; s-butyl; and t-butyl. In embodiments, $R^2$ is t-butyl. In embodiments, $R^2$ is $C_6$-$C_{22}$ aryl. In embodiments, $R^2$ is halo. In embodiments, $R^2$ is $C_1$-$C_{22}$ haloalkyl. In embodiments, $R^2$ is —$CF_3$. In embodiments, $R^2$ is H. In embodiments, $R^2$ is —$NH_2$. In embodiments, $R^2$ is —NH($C_1$-$C_{22}$ alkyl). In embodiments, $R^2$ is —N($C_1$-$C_{22}$ alkyl)$_2$. In embodiments, $R^2$ is —O—($C_1$-$C_{22}$ alkyl). In embodiments, $R^2$ is $(R^3)_3$—Si—.

When $R^2$ is alkyl, cycloalkyl, haloalkyl, or alkoxy, the alkyl chain can be straight or branched. The alkyl chain can optionally further be substituted by, for example, $Ar^1$, halo, amino, alkoxy, ether, and $(R^3)_3$—Si—. In embodiments, $R^2$ is t-butyl, cyclohexyl, or phenyl. Without intending to be bound by theory, it is believed that bulky $R^2$ groups of the ligand can force the aromatic rings of the ligand to be out of the plane to a significant degree and thereby inhibit the formation of the ligand-metal complex.

In general, $X^3$ can comprise $Ar^1$, $C_1$-$C_{22}$ alkyl, $C_5$-$C_8$cycloalkyl, $C_1$-$C_{22}$ haloalkyl, or H. In embodiments, $X^3$ can be selected from $Ar^1$, $C_1$-$C_{22}$ alkyl, $C_1$-$C_{22}$ haloalkyl, and H. In embodiments, $X^3$ can comprise H, methyl, ethyl, propyl, butyl, pentyl, hexyl, naphthyl, cyclohexyl or $C_6$-$C_{22}$ aryl, such as phenyl. In embodiments, $X^3$ can comprise t-butyl.

$R^5$ can be selected from $C_{1-22}$ alkyl, $C_5$-$C_8$cycloalkyl, or $Ar^1$. $R^6$ can be selected from $C_{1-22}$ alkyl, $C_5$-$C_8$cycloalkyl, or $Ar^1$.

As used herein, the term "alkyl" refers to straight chained and branched saturated hydrocarbon groups containing one to twenty-two carbon atoms, for example, one to twenty carbon atoms, or one to ten carbon atoms, or one to four carbon atoms. The term $C_n$ means the alkyl group has "n" carbon atoms. For example, $C_4$ alkyl refers to an alkyl group that has 4 carbon atoms. $C_{1-7}$ alkyl and $C_1$-$C_7$ alkyl refer to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group. A specific substitution on an alkyl can be indicated by inclusion in the term, e.g., "haloalkyl" indicates an alkyl group substituted with one or more (e.g., one to 10) halo; or "hydroxyalkyl" indicates an alkyl group substituted with one or more (e.g., one to 10) hydroxy.

As used herein, the term "cycloalkyl" refers to an aliphatic cyclic hydrocarbon group containing five to eight carbon atoms (e.g., 5, 6, 7, or 8 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl and $C_5$-$C_8$ cycloalkyl refer to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "aryl" refers to monocyclic or polycyclic (e.g., fused bicyclic and fused tricyclic) carbocyclic aromatic ring systems, having 6 to 22 ring carbon atoms. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heterocycle" refers to either a heteroaryl or heterocycloalkyl.

As used herein, the term "heterocycloalkyl" is defined similarly as cycloalkyl, except the ring contains one to three heteroatoms independently selected from oxygen, nitrogen, and sulfur. In particular, the term "heterocycloalkyl" refers to a ring containing a total of three to eight atoms, of which 1, 2, or 3 of those atoms are heteroatoms independently selected from the group consisting of oxygen, nitrogen, and sulfur, and the remaining atoms in the ring are carbon atoms. Nonlimiting examples of heterocycloalkyl groups include piperidine, tetrahydrofuran, tetrahydropyran, dihydrofuran, morpholine, and the like. Heterocycloalkyl groups can be saturated or partially unsaturated ring systems optionally substituted with, for example, one to three groups, independently selected from alkyl, alkenyl, OH, C(O)NH$_2$, NH$_2$, oxo (=O), aryl, haloalkyl, halo, and OH. Heterocycloalkyl groups optionally can be further N-substituted with alkyl, hydroxyalkyl, alkylene-aryl, and alkylene-heteroaryl. The heterocycloalkyl groups described herein can be isolated or fused to another heterocycloalkyl group, a cycloalkyl group, an aryl group, and/or a heteroaryl group. When a heterocycloalkyl group is fused to another heterocycloalkyl group, then each of the heterocycloalkyl groups can contain three to eight total ring atoms, and one to three heteroatoms. In some embodiments, the heterocycloalkyl groups described herein comprise one oxygen ring atom (e.g., oxiranyl, oxetanyl, tetrahydrofuranyl, and tetrahydropyranyl).

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur in the aromatic ring. Unless otherwise indicated, a heteroaryl group can be unsubstituted or substituted with one or more, and in particular one to four, substituents selected from, for example, halo, alkyl, alkenyl, OCF$_3$, NO$_2$, CN, NC, OH, alkoxy, amino, CO$_2$H, CO$_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring.

As used herein, the term "cyclic group" refers to any ring structure comprising a cycloalkyl, heterocycloalkyl, aryl, heteroaryl, or a combination thereof. A monocyclic group is a cyclic group comprising just one ring. Unless otherwise indicated, a cyclic group can be an unsubstituted or a substituted cyclic group.

As used herein, a "ketene" refers to a "—C(R)=C=O" group, wherein the R is a substituent on the carbon (e.g., alkyl, aryl, or H), or in the case of formula (III), the R group is R$^3$.

As used herein, the term "hydroxy" or "hydroxyl" refers to a "—OH" group. As used herein, the term "thiol" refers to the "—SH" group.

As used herein, the term "alkoxy" or "alkoxyl" refers to a "—O-alkyl" group. As used herein, the term "ether" refers to an "alkyl-O-alkyl" group, and optionally the alkyl groups can together form a ring. A C$_2$-C$_{22}$ ether refers to an ether group wherein both alkyl groups together, or a ring formed therefrom have 2 to 22 carbons. When provided as a ligand, the ether can be coordinated to the metal center through the oxygen. As used herein, the term "thioether" is defined similarly to "ether" except the oxygen atom is replaced with a sulfur atom.

As used herein, the term "halo" is defined as fluoro, chloro, bromo, and iodo.

As used herein, the term "carboxy" or "carboxyl" refers to a "—COOH" group.

As used herein, the term "amino" refers to a —NH$_2$ group, wherein one or both hydrogen can be replaced with an alkyl, cycloalkyl, or aryl group. As used herein, the term "amido" refers to an amino group that is substituted with a carbonyl moiety (e.g., —NRC(=O)— or —OC(=O)—NR—), wherein R is a substituent on the nitrogen (e.g., alkyl or H). When referring to a ligand, the term "amine" refers to a —NH$_3$ group, where one, two, or three hydrogen can be replaced with an alkyl, cycloalkyl, or aryl group. When referring to a ligand, the term "amide" refers to a NR$_2$ group, wherein each R is independently a hydrogen, alkyl, cycloalkyl, or aryl group. As used herein "imine" refers to a —N(R)=CR$_2$ group, wherein each R is independently an alkyl, cycloalkyl, or aryl group.

As used herein, the term "phosphine" refers to a —PH$_3$ group, wherein one, two or three hydrogen can be replaced with an alkyl, cycloalkyl, or aryl group. As used herein "phosphite" refers to a —P(OR)$_3$ group, wherein each R can individually be alkyl, cycloalkyl, or aryl. As used herein, "phosphonite" refers to a —PR(OR)$_2$ group, wherein each R can individually be alkyl, cycloalkyl, or aryl. As used herein, "phosphinite" refers to a —PR$_2$(OR) group, wherein each R can individually be alkyl, cycloalkyl, or aryl.

As used herein, the term "ester" refers to a —C(=O)OR group, wherein R is a substituent on the oxygen (e.g., alkyl or aryl).

As used herein, a "bidentate ligand" refers to a ligand that has two atoms capable of coordinating to a central atom or ion, such as a transition metal center. For example, a bidentate ligand can be ethylenediamine, bipyridine, oxalate, and BINAP (2,2'-bis(diphenylphosphino)-1,1'-binaphthyl).

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

In some cases, the catalysts have a structure:

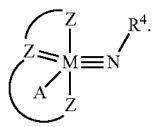

In embodiments, M is tungsten. In embodiments, A is THF. In embodiments, $R^4$ is tert-butyl. In embodiments, $R^4$ is phenyl. In embodiments, $R^4$ is cyclohexyl.

In some cases, the catalysts have a structure:

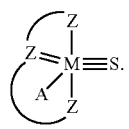

In embodiments, M is tungsten. In embodiments, A is THF.

In embodiments, the catalysts have a structure:

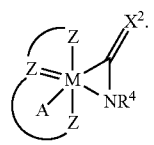

In embodiments, M is tungsten. In embodiments, A is THF. In embodiments, $R^4$ is tert-butyl. In embodiments, $X^2$ is O. In embodiments, $R^4$ is tert-butyl and $X^2$ is O.

In embodiments, the catalysts have a structure:

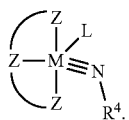

In embodiments, M is tungsten. In embodiments, L is —C($R^3$)=C=O. In embodiments, $R^3$ is tert-butyl. In embodiments, $R^4$ is tert-butyl.

In embodiments, the catalysts of the disclosure herein can be in equilibrium with a second catalyst of the disclosure herein. In embodiments, the catalysts of formula (I) can be in equilibrium with the catalysts of formula (III). In embodiments, the catalysts having a structure:

can be in equilibrium with a catalyst having a structure:

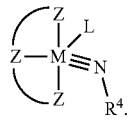

For example, a catalyst having a structure:

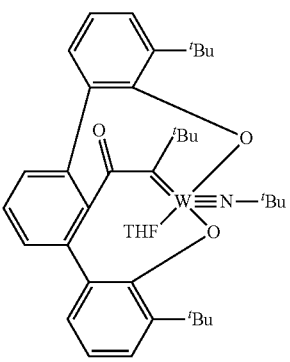

can be in equilibrium with a catalyst having a structure:

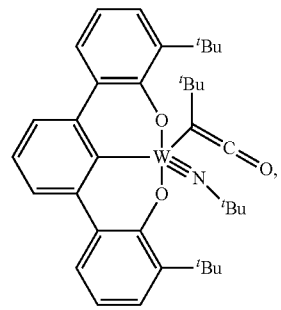

such as shown in the scheme below.

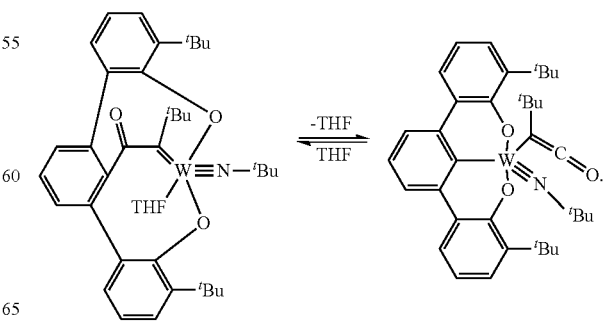

In embodiments, the catalyst of formula (I), formula (II), or formula (III) can be selected from
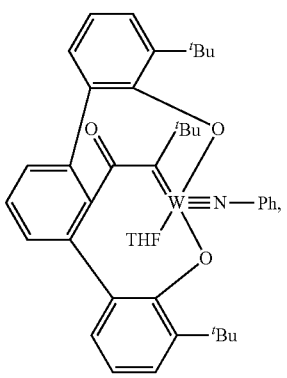
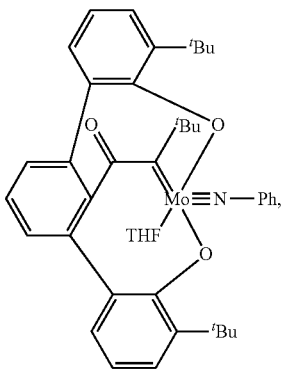
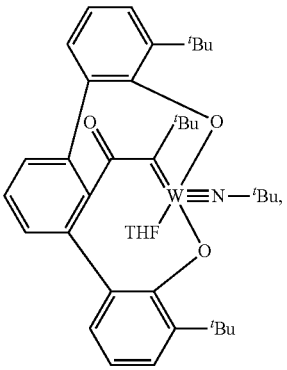
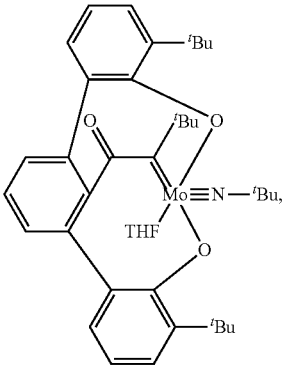
-continued
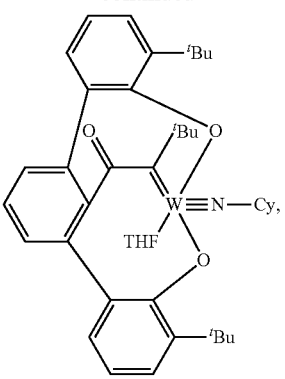
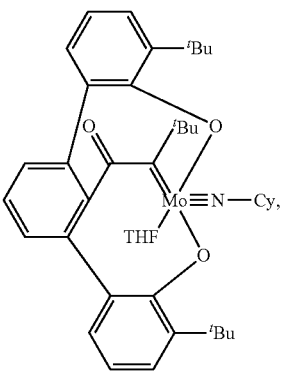
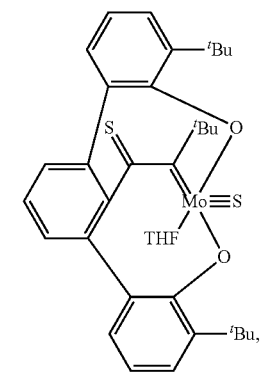
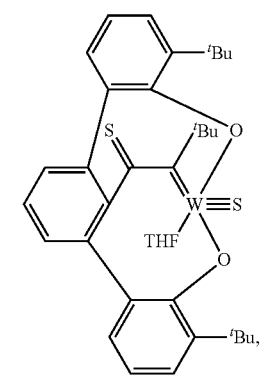

-continued
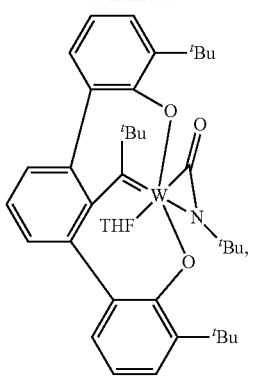
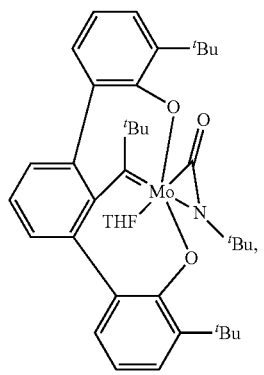
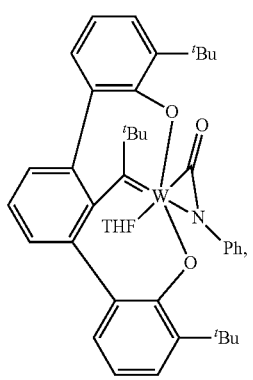
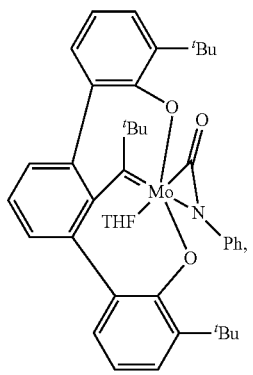
-continued
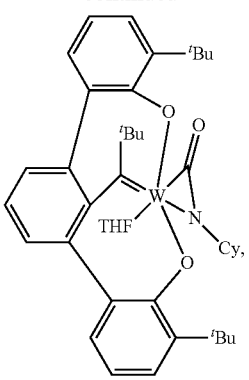
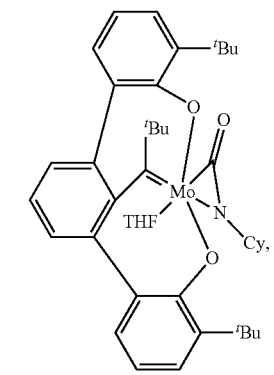
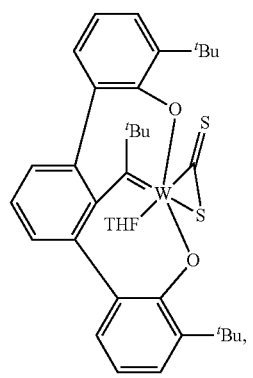
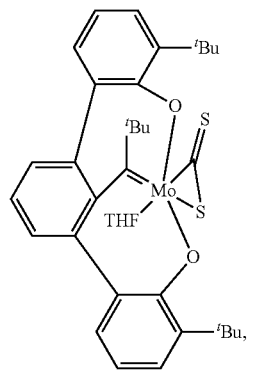

-continued
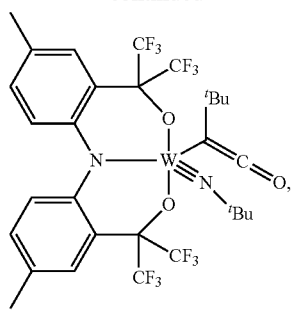
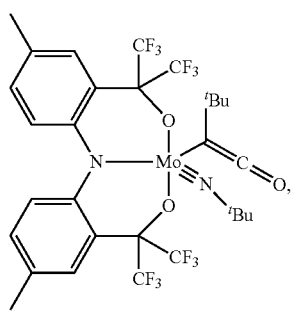
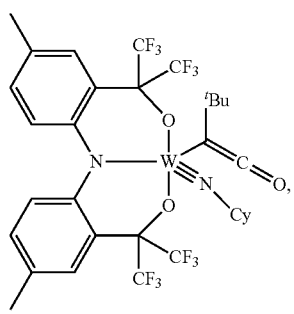
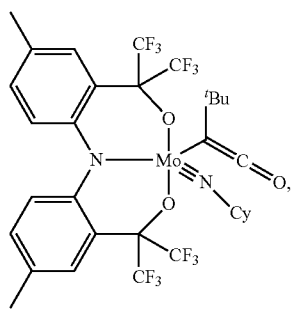
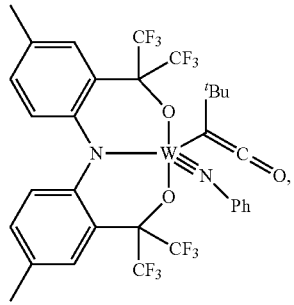
-continued
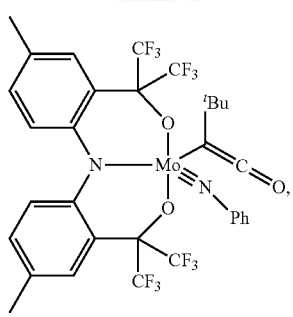
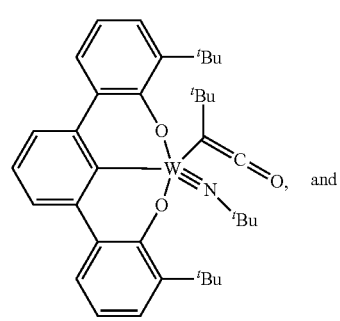
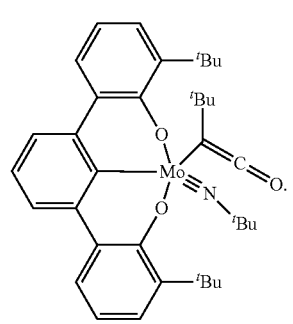
In embodiments, the catalyst of formula (I), formula (II), or formula (III) can be selected from
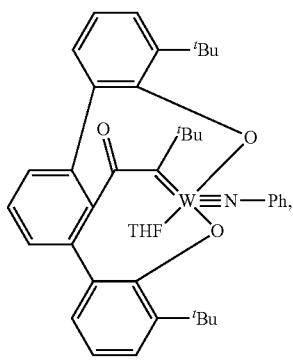

-continued

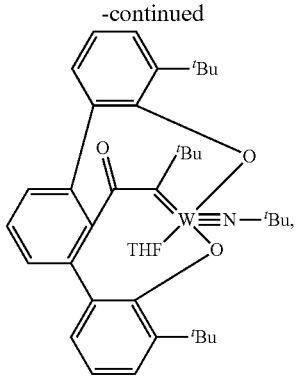

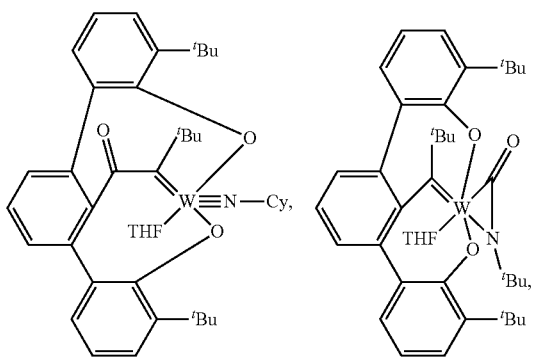

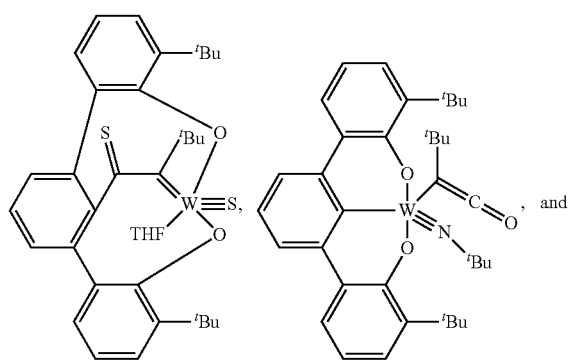

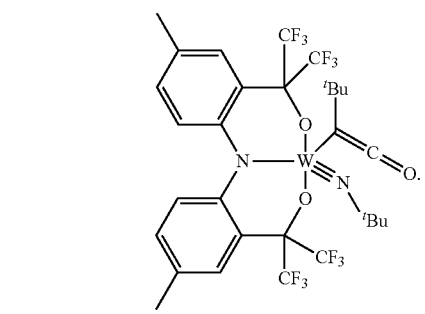

Methods of Making the Catalysts of the Disclosure

The disclosure further provides a method for making the catalyst having a structure represented by formula (I) or formula (II), the method can comprise reacting a complex of formula (IV) or formula (VI) and $CS_2$ or an isocyanate having a structure of formula (V) under conditions sufficient to form the catalyst:

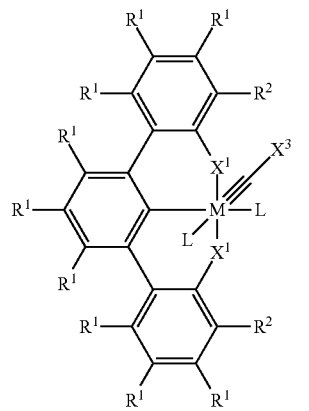

(IV)

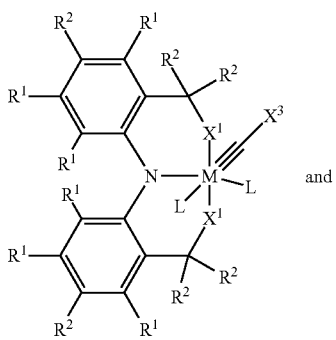

(VI)

(V)

wherein each L is independently absent or can be selected from phosphine, phosphite, phosphonite, phosphinite, amine, amide, imine, alkoxy, ether, thioether, and a five- or six-membered monocyclic group having 1 to 3 ring heteroatoms; or both L together comprise a bidentate ligand, e.g., each L is a L-type ligand. L-type ligands are described in detail throughout Gray L. Spessard and Gray O. Miessler, Organometallic Chemistry, published by Oxford University Press, 2010, for example, on page 59. Contemplated bidentate ligands include, but are not limited to, bipyridine, ethylenediamine, diaminocyclohexane, acetylacetonate, oxalate, and phenanthroline. The five- or six-membered monocyclic groups can include 1 to 3 heteroatoms or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, $C_1$-$C_{22}$ alkyl, substituted $C_1$-$C_{22}$ alkyl, $C_1$-$C_{22}$ heteroalkyl, substituted $C_1$-$C_{22}$ heteroalkyl, $C_6$-$C_{24}$ aryl, substituted $C_6$-$C_{24}$ aryl, $C_6$-$C_{24}$ heteroaryl, substituted $C_6$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, including but not limited to, $C_1$-$C_{22}$ alkoxy, $C_6$-$C_{24}$ aryloxy, $C_2$-$C_{22}$ alkylcarbonyl, $C_6$-$C_{24}$ arylcarbonyl, carboxy, carboxylate, carbamoyl, carbamido, formyl, thioformyl, amino, nitro, and nitroso.

Phosphine and amine ligands can include primary, secondary, and tertiary phosphines and amines. The phosphine and amine ligands can include 0 to 3 alkyl groups, 1 to 3 alkyl groups, or 1 to 2 alkyl groups selected from $C_1$-$C_{22}$ alkyl. The phosphine and amine ligands can also include 0 to 3 aryl or heteroaryl groups, 1 to 3 aryl or heteroaryl groups, or 1 to 2 aryl or heteroaryl groups selected from five- and six-membered aryl or heteroaryl rings.

In embodiments, at least one L is absent. In embodiments wherein L is absent, the complex of formula (II) is coordinatively unsaturated. In embodiments, at least one L is a phosphine. In embodiments, at least one L is an amine. In embodiments, at least one L is an ether or cyclic ether. In refinements of the foregoing embodiments, at least one L is selected from $NH_3$, trimethyl amine and triethyl amine. In embodiments, at least one L is a five- or six-membered monocyclic group having 1 to 3 ring heteroatoms. In refinements of the foregoing embodiment, at least one L is selected from tetrahydrofuran, tetrahydrothiophene, pyridine, and tetrahydropyran.

In embodiments, L can comprise THF and derivatives thereof, thiophene and derivatives thereof, or pyridine and derivatives thereof. In embodiments, both L's are present and each L is THF.

In embodiments, the complex of formula (IV) has a structure represented by a formula:

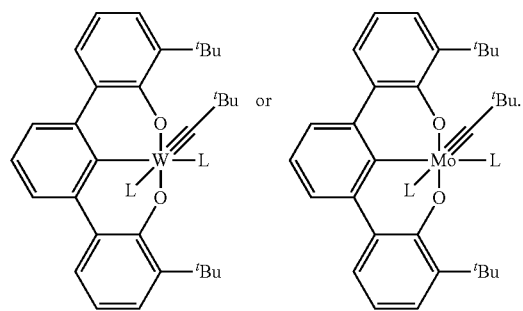

In embodiments, the complex of formula (VI) has a structure represented by a formula:

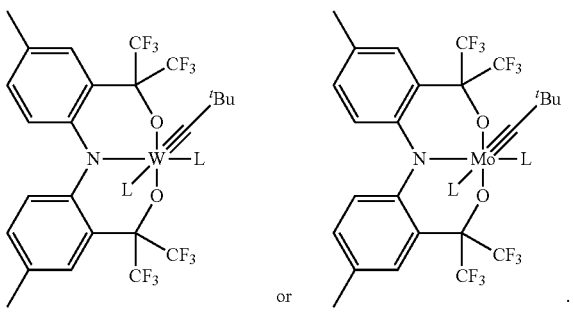

In embodiments, the reaction of the complex of formula (IV) or formula (VI) and $CS_2$ or an isocyanate having a structure of formula (V) can occur neat, in cases when the compound of formula (V) is a liquid. In embodiments, the reaction of the complex of formula (IV) or formula (VI) and $CS_2$ or an isocyanate having a structure of formula (V) can occur in solution. Suitable solvents include nonpolar aprotic solvents, such as, but not limited to, benzene, toluene, hexanes, pentanes, dichloromethane, trichloromethane, a chloro-substituted benzene, a deuterated analog of any of the foregoing and any combination of the foregoing. As will be understood by one of ordinary skill in the art, polar aprotic solvents may also be suitable provided they do not compete with the $CS_2$ or an isocyanate having a structure of formula (V) to coordinate at the metal center. Suitable polar aprotic solvents can include, but are not limited to, diethyl ether, dimethoxyethane, tetrahydrofuran, a deuterated analog of the foregoing, and any combination of the foregoing.

The reaction of the complex of formula (IV) or formula (VI) and $CS_2$ or an isocyanate having a structure of formula (V) can occur at any suitable temperature for any suitable time. It is well understood in the art that the rate of a reaction can be controlled by tuning the temperature. Thus, in general, as the reaction temperature increases the reaction time can decrease.

Reaction temperatures can be in a range of about −80° C. to about 100° C., about −70° C. to about 80° C., about −50° C. to about 75° C., about −25° C. to about 50° C., about 0° C. to about 35° C., about 5° C. to about 30° C., about 10° C. to about 25° C., about 15° C. to about 25° C., or about 20° C. to about 25° C., for example, about 0° C., about 5° C., about 10° C., about 15° C., about 20° C., about 25° C., about 30° C., or about 35° C. Reaction times can be instantaneous or in a range of about 30 seconds to about 72 h, about 1 min to about 72 h, about 5 min to about 72 h, about 10 min to about 48 h, about 15 min to about 24 h, about 20 min to about 12 h, about 25 min to about 6 h, or about 30 min to about 3 h, for example, 30 seconds, 1 min, 5 min, 10 min, 15 min, 20 min, 25 min, 30 min, 35 min, 40 min, 45 min, 50 min, 55 min, 60 min, 75 min, 90 min, 105 min, 2 h, 3 h, 4 h, 5 h, 6 h, 12 h, 18 h, 24 h, 36 h, 48 h, 60 h, or 72 h.

Methods of Preparing Polymers

The disclosure further provides a method of preparing a cyclic polymer, the method comprising admixing a plurality of alkenes in the presence of the catalyst of formula (I) or formula (II) herein under conditions sufficient to polymerize the plurality of alkenes, thereby forming the cyclic polymer, wherein the cyclic polymer ring comprises alkene groups.

Cyclic polymers can be prepared from any compound that includes a carbon-carbon double bond. In embodiments, more than one alkene monomer can be defined as the plurality of alkenes. A wide variety of alkene monomers, including, but not limited to, unsubstituted, monosubstituted, or disubstituted alkenes can be used to prepare cyclic polymers. Substituted alkenes can include alkenes substituted with 1 to 3 heteroatoms selected from oxygen, nitrogen, and sulfur. The alkene monomer can be a cyclic alkene. In embodiments, the cyclic alkene can be bicyclic.

In embodiments, the plurality of alkenes can comprise a mixture of different alkenes. In embodiments, the plurality of alkenes can comprise the same alkenes. The plurality of alkenes polymerized to form a cyclic polymer can comprise unsubstituted or substituted cyclopropene, cyclobutene, cyclopentene, cycloheptene, and cyclooctene, norbornene, dicyclopentadiene, norbornene anhydride, diester from norbornene anhydride, imide from norbornene anhydride, oxanorbornene, oxanorbornene anhydride, ester of oxanorbornene anhydride, and imide of oxanorbornene anhydride, or combinations thereof, wherein the ester is from a $C_1$-$C_{10}$ alkyl or aryl alcohol, the imide is from $C_1$-$C_{10}$ alkyl or aryl amine; wherein substituents can be $C_1$-$C_{10}$ alkyl, aryl, $C_1$-$C_{10}$ alkoxy, aryloxy, $C_1$-$C_{10}$ carboxylic acid ester, or carboxylic acid amide, optionally substituted one or two times with $C_1$-$C_{10}$ alkyl or aryl.

Examples of solvents that may be used in the polymerization reaction include organic solvents that are inert under the polymerization conditions, such as aromatic hydrocarbons, halogenated hydrocarbons, ethers, aliphatic hydrocarbons, or mixtures thereof. Suitable halogenated hydrocarbon solvents include methylene chloride, chloroform, chlorobenzene, 1,2-dichloroethane, dichlorobenzene, and mixtures thereof.

The polymerization can be carried out at, for example, ambient temperatures in dry conditions under an inert atmosphere. The polymerization can be carried out at a temperature in the range of about 30° C. to about 100° C. or greater, for example, in a range of about 35° C. to about 85° C. or about 50° C. to about 70° C. Polymerization times will vary, depending on the particular monomer or monomers, the catalyst of formula (I) or formula (II) and desired molecular weight of the cyclic polymer product. The progress of the reaction can be monitored by standard techniques, e.g., nuclear magnetic resonance (NMR) spectroscopy.

The molecular weight of the cyclic polymers can be small, equivalent to oligomers of three to ten repeating units, or the molecular weights can be of any size up to tens and hundreds of thousands or millions in molecular weight, for example, in a range of about 200 Da to about 5,000,000 Da, about 500 Da to about 4,000,000 Da, about 1,000 Da to about 3,000,000 Da, about 5,000 Da to about 2,000,000 Da or about 10,000 to about 1,000,000 Da. The cyclic polyalkene can be converted to substituted cyclic polyalkanes by an addition reaction at the alkene groups of the cyclic polyalkenes; for example, the addition of halogens, alcohols, amines, or any other olefin addition reactions. In embodiments, the cyclic polymer is syndiotactic.

Following polymer synthesis and recovery, the unsaturated polymer provided may be hydrogenated using conventional means, e.g., via standard $H_2/Pd/C$ procedures or via tosyl-hydrazine decomposition. Generally, either procedure will result in a saturated polymer having hydrogenated more than 99% of the unsaturated functionalities in the polymer backbone, as may be determined by $^1H$ and $^{13}C\{^1H\}$ NMR spectroscopy. In embodiments, the method herein can further comprise hydrogenating the cyclic polymer alkene groups to form cyclic polymer alkane groups. In embodiments, the hydrogenation is performed under conditions sufficient to fully hydrogenate the cyclic polymer alkene groups, thereby forming a saturated cyclic polymer. As used herein, a cyclic polymer is fully hydrogenated if more than 99% of the unsaturated functionalities are hydrogenated. Advantageously, the stereoregularity of the polymers are maintained during hydrogenation, providing for stereoregular saturated cyclic polymers.

EXAMPLES

Materials and Methods

Unless otherwise specified, all manipulations were performed under an inert atmosphere using standard Schlenk or glove-box techniques. Glassware was oven-dried before use. Pentane, hexane, toluene, diethyl ether ($Et_2O$), tetrahydrofuran (THF), benzene ($C_6H_6$) were dried using a Glass Contour drying column and stored over 3 Å molecular sieves. Benzene-$d_6$ (Cambridge Isotopes) was dried over calcium hydride ($CaH_2$), distilled, and stored over 3 Å molecular sieves. Toluene-$d_8$ (Cambridge Isotopes) was dried over $CaH_2$, vacuum transferred, and stored over 3 Å molecular sieves. Norbornene (NBE) was refluxed over sodium, distilled, and stored under nitrogen. The tungsten-alkylidyne [$^tBuOCO$]W≡C$^tBu$(THF)$_2$ and [$CF_3$—ONO]W≡C$^tBu$(THF)$_2$ was prepared according to published procedures (Sarkar, S. et al., *J. Am. Chem. Soc.* 2012, 134, 4509-4512 and Gonsales, S. A. et al., *J. Am. Chem. Soc.* 2015, 137, 4840-4845). Linear cis-syndiotactic polynorbornene (cis-poly(NBE)) was synthesized following a literature procedure (Grubbs et al., *J. Am. Chem. Soc.* 2016, 138, 1394-1405), using the commercially available catalyst, complex 15 having a structure of

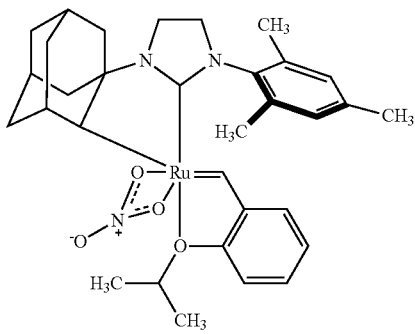

("Grubbs' catalyst") (Grubbs et al., *J. Am. Chem. Soc.* 2013, 135, 10032-10035). Complex 15 was purchased from Sigma-Aldrich (CAS 1352916-84-7, Hoveyda-Grubbs Catalyst M2001) and used without further purification. Post polymerization bromination of poly(NBE) was conducted according to literature procedure (Hyvl et al., *Macromolecules* 2015, 48, 3148-3152). Isocyanate (cyclohexyl, phenyl, and tert-butyl) were purchased from Sigma-Aldrich, dried over $CaH_2$, distilled, and stored under nitrogen. 1H, $^{13}C\{^1H\}$ NMR and 2D NMR spectra were obtained on Varian INOVA (500 MHz) and Bruker (600 MHz) spectrometers. The chemical shifts are reported in δ (ppm), referenced to the lock signal on the TMS scale for $^1H$ and $^{13}C\{^1H\}$ spectra, and $CFCl_3$ for $^{19}F$ NMR spectra. The assignments are primarily based on the cross-peaks observed in the $^1H$-$^{13}C$ gHMBC and gHSQC spectra. The spectra were recorded at 25° C. unless noted otherwise. Elemental analyses were performed at the CENTC Elemental Analysis Facility, Department of Chemistry, University of Rochester. Electrospray ionization mass spectrometry (ESI-MS) spectra were collected by direct injection into an Agilent 6120 Time-of-Flight (TOF) spectrometer at a gas temperature of 350° C. with fragmentation voltage of 120 V. Infrared spectra were collected on a Thermo Nicolet 5700 Fourier-transform infrared (FTIR) spectrometer equipped with a single bounce, diamond-stage attenuated total reflectance (ATR) accessory. Size-exclusion chromatography was performed in THF at 35° C. and a flow rate of 1.0 mL/min (Agilent isocratic pump, degasser, and autosampler; columns: three PLgel 5 µm MIXED-D mixed bed columns, molecular weight range 200-400,000 g/mol). Detection consisted of a Wyatt Optilab rEX refractive index detector operating at 658 nm, a Wyatt miniDAWN Treos light scattering detector operating at 656 nm, and a Wyatt ViscoStar-II viscometer. Absolute molecular weights and molecular weight distributions were calculated using the Wyatt ASTRA software.

Example 1—Synthesis of Catalyst

Synthesis of [O$_2$C($^t$BuC≡)W($\eta^2$-(N,C)-$^t$BuN=C=O)(THF)] ("11-$^t$Bu")

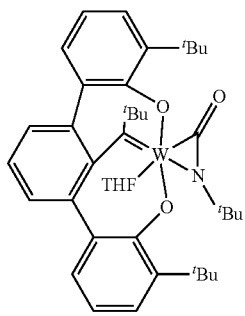

In a nitrogen-filled glovebox, a 20 mL glass vial equipped with a stir bar was charged with

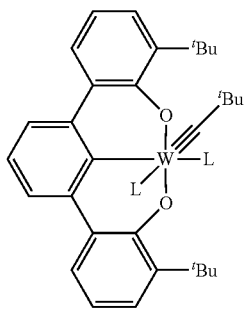

(0.149 g, 1.94×10$^{-4}$ mol) in benzene (3 mL) and cooled to −35° C. for 15 min. 2-isocyanato-2-methylpropane (22.2 µl, 1.94×10$^{-4}$ mol) was added via micropipette with stirring. As the solution warmed to ambient temperature, a gradual color change from dark red to orange-red was observed. After 45 min of stirring at ambient temperature, the solvent was removed in vacuum to yield a bright orange solid. The orange solid was then dissolved in a minimal amount of benzene and filtered. The filtrate was collected, dried under dynamic vacuum, and triturated with pentane to obtain 11-$^t$Bu as an orange powder (0.108 g, 69.8%). Single crystals were obtained from the diffusion of THF into a concentrated toluene solution of 11-$^t$Bu at −35° C. In toluene-d$_8$, complex 11-$^t$Bu exhibited a $^1$H NMR spectrum indicative of C$_s$ symmetry. Three singlets attributable to the alkylidene, pincer and isocyanate $^t$Bu groups resonated at 0.90, 1.35 and 1.77 ppm, respectively. In the $^{13}$C{$^1$H} NMR spectrum, the alkylidene carbon (W=C) appeared at 279.7 ppm. A resonance at 120.0 ppm corresponding to the C$_{ipso}$ carbon indicated the central aryl ring of the pincer is not directly attached to the W(VI) metal center, since that resonance commonly appears near 200 ppm. A multinuclear $^1$H-$^{13}$C HSQC NMR spectrum of 11-$^t$Bu confirms the connectivity of the C$_{ipso}$ carbon with the W=CC(CH$_3$)$_3$ protons. In complex 11-$^t$Bu, the resonance appeared at 202.6 ppm confirming its $\eta^2$-(C,N) coordination to the formally W(IV) ion.

$^1$H NMR (C$_7$D$_8$, 600.2 MHz) δ (ppm): 7.35 (m, 2H, Ar—H$_{8,10}$), 7.30 (m, 1H, Ar—Hg), 7.26 (dd, 2H, J=7.8 Hz, J=1.7 Hz, Ar—H$_{3,16}$), 7.21 (dd, 2H, J=7.5 Hz, J=1.7 Hz, Ar—H$_{5,14}$), 6.81 (dd, 2H, J=7.6 Hz, J=7.6 Hz, Ar—H$_{4,15}$), 3.36 (m, 4H, THF-H$_{33,36}$), 1.82 (s, 9H, H$_{38-40}$), 1.39 (s, 18H, ligand C(CH$_3$)$_3$ (H$_{20-22,24-26}$)), 1.01 (m, 4H, THF-H$_{34,35}$), 0.95 (s, 9H, H$_{29-31}$).).

$^{13}$C{$^1$H} NMR (C$_7$D$_8$, 126 MHz) δ (ppm): 279.9 (s, W=Cα (C$_{27}$)), 202.3 (s, C$_{32}$), 167.7 (s, C$_{1,18}$), 159.6 (s, C$_{7,11}$), 137.7 (s, C$_{2,17}$), 135.5 (s, C$_9$), 130.7 (s, C$_{6,13}$), 130.3 (s, C$_{8,10}$), 128.4 (s, C$_{5,14}$), 126.8 (s, C$_{3,16}$), 120.2 (s, C$_{12}$), 120.1 (s, C$_{4,15}$), 71.1 (s, THF-C$_{33,36}$), 61.6 (s, C$_{37}$), 46.1 (s, W=CC(CH$_3$)$_3$ (C$_{28}$)), 35.2 (s, ligand C(CH$_3$)$_3$ (C$_{19,23}$)), 33.1 (s, W=CC(CH$_3$)$_3$ (C$_{29-31}$)), 30.3 (s, Ar—C(CH$_3$)$_3$ (C$_{20-22,24-26}$), 30.0 (s, C$_{38-40}$), 25.0 (s, THF-C$_{34,35}$).

Elemental Analysis calcd. (%) C$_{40}$H$_{53}$NO$_4$W.0.50$_7$H$_8$ (841.78 g/mol): C, 62.069; H, 6.826; N, 1.664. Found: C, 61.509; H, 6.950; N, 1.676.

HRMS (ESI-MS) m/z: [M+H]$^+$ Calcd for C$_{36}$H$_{45}$NO$_3$W$^+$ 724.2909. Found: 724.2981.

Synthesis of [O$_2$C($^t$BuC≡)W($\eta^2$-(N,C)-PhN=C=O)(THF)] ("11-Ph")

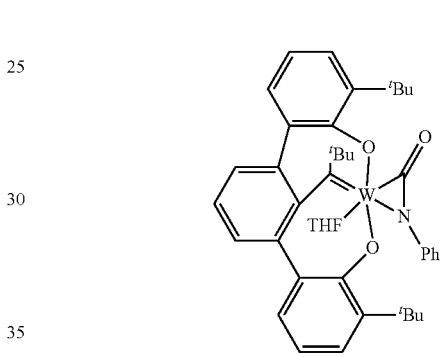

In a nitrogen-filled glovebox, a glass vial equipped with a stir bar was charged with

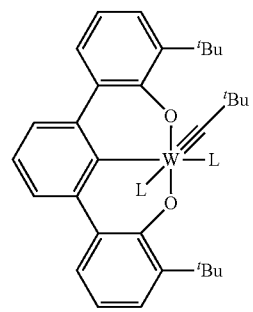

(0.072 g, 9.40×10$^{-5}$ mol) in toluene-d$_8$ (~0.6 mL) and cooled to −35° C. for 15 min. Isocyanatobenzene (10.2 µL, 9.40×10$^{-5}$ mol) was added via micropipette with stirring. As the solution warmed to ambient temperature, a gradual change from dark red to bright red was observed. Complex 11-Ph forms instantaneously upon addition. Allowing the reaction mixture to continue at ambient temperature, 11-Ph completely converts to 6-NPh over 3 d. At this point, complex 11-Ph is characterized in situ by NMR spectroscopy. In addition to 11-Ph (1.5p) we also observed the presence of 6-NPh (1p), free THF (2.6p), and isocyanatobenzene (0.44p) by NMR spectroscopy. Cooling the solution below 0° C. slowed the conversion of 11-Ph to 6-NPh, thus permitting in situ characterization. The NMR data supported the assignment of 11-Ph as a $C_s$-symmetric tetraanionic alkylidene complex similar to 11-$^t$Bu.

$^1$H NMR (C$_7$D$_8$, 500 MHz) δ (ppm): 8.25 (dd, 2H, J=8.2 Hz, J=1.5 Hz, Ar—H$_{38,42}$), 7.37 (d, 2H, J=8.7 Hz, Ar—H$_{8,10}$), 7.35 (t, 2H, J=7.9 Hz, Ar—H$_{39,41}$), 7.27 (m, 2H, Ar—H$_9$), 7.24 (d, 2H, J=8.0 Hz, Ar—H$_{3,16}$), 7.23 (d, 2H, J=8.0 Hz, Ar—H$_{6,14}$), 7.06 (t, 1H, J=7.4 Hz, Ar—H$_{40}$), 6.83 (dd, 2H, J=7.5 Hz, J=7.5 Hz, Ar—H$_{4,16}$), 3.44 (m, 4H, THF-H$_{33,36}$), 1.29 (s, 18H, ligand C(CH$_3$)$_3$ (H$_{20-22,24-26}$)), 1.02 (s, 9H, H$_{29-31}$), 0.88 (m, 4H, THF-H$_{34,35}$).

$^{13}$C determined by $^1$H-$^{13}$C gHSQC and gHMBC experiments (C$_7$D$_8$, 500 MHz) δ (ppm): 278.0 (s, W=Cα (C$_{27}$)), 165.5 (s, C$_{1,18}$), 157.2 (s, C$_{7,11}$), 141.7 (s, C$_{37}$), 135.0 (s, C$_{2,17}$), 133.6 (s, C$_9$), 128.0 (s, C$_{6,13}$), 127.4 (s, C$_{8,10}$), 126.9 (s, C$_{39,41}$), 125.6 (s, C$_{6,14}$), 124.4 (s, C$_{3,16}$), 123.9 (s, C$_{40}$), 118.6 (s, C$_{38,42}$), 117.7 (s, C$_{4,15}$), 116.8 (s, C$_{12}$), 69.0 (s, THF-C$_{33,36}$), 43.9 (s, W=CC(CH$_3$)$_3$ (C$_{28}$)), 32.2 (s, ligand C(CH$_3$)$_3$ (C$_{19,23}$)), 30.5 (s, W=CC(CH$_3$)$_3$ (C$_{29-31}$)), 27.4 (s, Ar—C(CH$_3$)$_3$ (C$_{20-22,24-26}$)), 22.4 (s, THF-C$_{34,35}$).

Synthesis of [O$_2$C($^t$BuC=)W(η$^2$-(N,C)-CyN=C=O)(THF)] ("11-Cy")

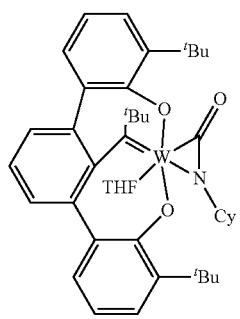

In a nitrogen-filled glovebox, a 20 mL glass vial equipped with a stir bar was charged with

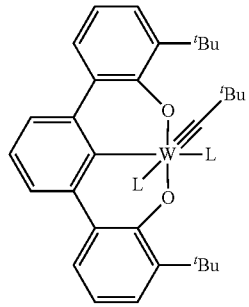

(0.111 g, 1.45×10$^{-4}$ mol) in toluene-d$_8$ (~0.6 mL) and cooled to −35° C. for 15 min. Isocyanatocyclohexane (18.5 μL, 1.45×10$^{-4}$ mol) was added via micropipette with stirring. As the solution warmed to ambient temperature, a gradual color change from dark red to bright orange was observed. Complex 11-Cy forms instantaneously upon addition. Allowing the reaction mixture to continue at ambient temperature, 11-Cy completely converts to 6-NCy over 5 d. At this point, complex 11-Cy is characterized in situ by NMR spectroscopy. The NMR data supported the assignment of complex 11-Cy as a $C_s$-symmetric tetraanionic alkylidene. In the $^1$H NMR spectrum of 11-Cy (toluene-d$_8$, −30° C.), two singlets appeared in 1:2 ratio at 0.96 and 1.37 ppm corresponding to the $^t$Bu protons on the tungsten alkylidene and the $^t$Bu protons on the ligand, respectively. In the $^{13}$C{$^1$H} NMR spectrum, the alkylidene carbon (W=C) carbon corresponded to the downfield resonance at 280.1 ppm, and a resonance at 120.3 ppm corresponded to the C$_{ipso}$ carbon, again indicating that the backbone of the ligand is not directly attached to the W(VI) metal center. A multinuclear $^1$H-$^{13}$C HSQC spectrum of 11-Cy confirmed the connectivity of the C$_{ipso}$ carbon with the W=CC(CH$_3$)$_3$ protons. The complex possesses a η$^2$-bound cyclohexyl isocyanato ligand similar to 11-$^t$Bu. The $^{13}$C{$^1$H} NMR spectrum was consistent with an η$^2$-(N,C) binding mode (δ 202.5 ppm) for complex 11-Cy.

$^1$H NMR (C$_7$D$_8$, 500 MHz) δ (ppm): 7.29 (d, J=7.6 Hz, 2H, Ar—H$_{8,10}$), 7.22 (dd, J=8.1 Hz, J=1.4 Hz, 2H, Ar—H$_{3,16}$), 7.18 (dd, J=7.8 Hz, J=1.4 Hz, 2H, Ar—H$_{5,14}$), 7.18 (t, J=7.4 Hz, 1H, Ar—H$_9$), 6.78 (dd, J=7.6 Hz, J=7.6 Hz, 2H, Ar—H$_{4,15}$), 4.45 (tt, J=11.5 Hz, J=4.0 Hz, 1H, WNCy Ar—H$_{37}$), 3.33 (br, 4H, THF-H$_{33,36}$), 2.67 (d, J=12.0 Hz, 2H, Cy CH(eq.)$_{38,42}$), 1.86 (d, J=14.8 Hz, 2H, Cy CH (eq.)$_{39,41}$), 1.79 (q, J=13.6 Hz, 2H, Cy CH(ax.)$_{38,42}$), 1.62 (d, J=11.4 Hz, 2H, Cy CH(eq.)$_{40}$), 1.37 (m, 2H, Cy CH(ax.)$_{39,41}$), 1.37 (s, 18H, ligand C(CH$_3$)$_3$ (H$_{20-22,24-26}$)), 1.21 (m, 1H, Cy CH(ax.)$_{40}$), 0.96 (s, 9H, H$_{29-31}$), 0.89 (br, 4H, THF-H$_{34,35}$).

$^{13}$C determined by $^1$H-$^{13}$C gHSQC and gHMBC experiments (CD$_8$, 500 MHz) δ (ppm): 280.1 (s, W=Cα (C$_{27}$)), 202.5 (s, C$_{32}$), 167.7 (s, C$_{1,18}$), 159.1 (s, C$_{7,11}$), 137.2 (s, C$_{2,17}$), 135.3 (s, C$_9$), 130.4 (s, C$_{6,13}$), 129.8 (s, C$_{8,10}$), 128.1 (s, C$_{6,14}$), 126.7 (s, C$_{3,16}$), 120.3 (s, C$_{12}$), 119.9 (s, C$_{4,16}$), 71.1 (s, THF-C$_{33,36}$), 60.7 (s, C$_{37}$), 46.0 (s, W=CC(CH$_3$)$_3$ (C$_{28}$)), 35.0 (s, ligand C(CH$_3$)$_3$ (C$_{19,23}$)), 33.1 (s, C$_{38,42}$), 32.8 (s, W=CC(CH$_3$)$_3$ (C$_{29-31}$)), 30.0 (s, ANC(CH$_3$)$_3$ (C$_{20-22,24-26}$)), 26.0 (s, C$_{40}$), 25.5 (s, C$_{39,41}$).

Synthesis of tungsten imido alkylidene ("6-N$^t$Bu")

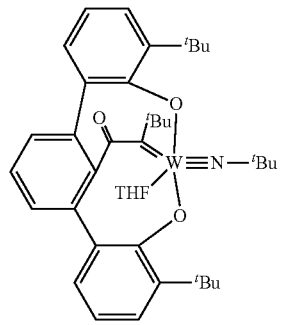

In a nitrogen-filled glovebox, a 20 mL glass vial equipped with a stir bar was charged with

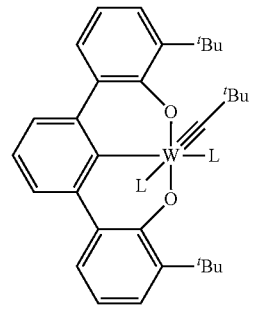

(0.210 g, 2.74×10⁻⁴ mol) in benzene (4 mL) and cooled to −35° C. for 15 min. 2-isocyanato-2-methylpropane (31.3 µL, 2.74×10⁻⁴ mol) was added via micropipette in one shot with stirring. As the solution warmed to ambient temperature, a color change from dark red to orange-red was observed. The solution was then further allowed to heat for 5 h at 60° C. inside the glovebox, during which another color change was observed from orange-red to scarlet. After 5 h, the heating was stopped, and the solution was allowed to reach ambient temperature. The solvent was filtered and removed in vacuum, then triturated with pentane to yield a bright scarlet solid (0.161 g, 73.8%). Single crystals amenable to X-Ray diffraction were obtained from the diffusion of pentane into a concentrated benzene solution of 6-N$^t$Bu at ambient temperature.

Alternatively, in a nitrogen-filled glovebox, a 20 mL glass vial equipped with a stir bar was charged with 11-$^t$Bu (0.090 g, 1.13×10⁻⁴ mol) in benzene (3 mL) and the solution was allowed to heat for 5 h at 60° C. inside the glovebox. A color change from orange to scarlet was observed within 5 minutes of heating the solution at 60° C. After 5 h, the heating was stopped, and the solution was allowed to reach ambient temperature. The solvent was removed in vacuum and triturated with pentane to yield a bright scarlet solid (0.083 g, 91.9%). Single crystals amenable to X-Ray diffraction were obtained from the diffusion of pentane into a concentrated benzene solution of 6-N$^t$Bu at ambient temperature.

$^1$H NMR (C$_7$D$_8$, 600.2 MHz) δ (ppm): 7.27 (dd, 2H, J=7.8 Hz, J=1.7 Hz, Ar—H$_{3,16}$), 7.24 (dd, 2H J=7.4 Hz, J=1.7 Hz, Ar—H$_{5,14}$), 7.00 (m, 1H, Ar—H$_9$), 6.95 (m, 2H, Ar—H$_{8,10}$), 6.78 (dd, 2H, J=7.6 Hz, J=7.6 Hz, Ar—H$_{4,15}$), 3.33 (m, 4H, THF-H$_{33,36}$), 1.60 (s, 9H, H$_{38-40}$), 1.59 (s, 18H, ligand C(CH$_3$)$_3$ (H$_{20-22,24-26}$)), 1.19 (s, 9H, H$_{29-31}$), 1.07 (s, 4H, THF-H$_{34,35}$).

$^{13}$C{$^1$H} NMR (C$_7$D$_8$, 150.9 MHz) δ (ppm): 257.3 (s, W≡Cα (C$_{27}$)), 185.1 (s, C$_{32}$), 167.7 (s, C$_{1,18}$), 148.1 (s, C$_{7,11}$), 137.2 (s, C$_{2,17}$), 134.0 (s, C$_{12}$), 131.9 (s, C$_9$), 131.3 (s, C$_{6,13}$), 130.3 (s, C$_{8,10}$), 128.1 (s, C$_{5,14}$), 126.4 (s, C$_{3,16}$), 120.3 (s, C$_{4,15}$), 72.9 (s, C$_{37}$), 71.3 (s, THF-C$_{33,36}$), 40.4 (s, W≡CC(CH$_3$)$_3$ (C$_{28}$)), 35.5 (s, ligand C(CH$_3$)$_3$ (C$_{19,23}$)), 33.0 (s, C$_{38}$-40), 32.2 (s, W≡CC(CH$_3$)$_3$ (C$_{29-31}$)), 30.9 (s, Ar—C(CH$_3$)$_3$ (C$_{20-22,24-26}$)), 25.3 (s, THF-C$_{34,35}$).

Synthesis of tungsten imido alkylidene ("6-NPh")

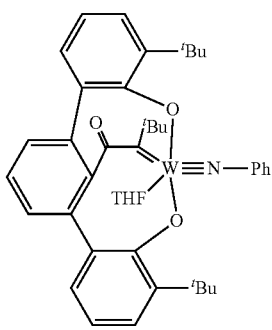

In a nitrogen-filled glovebox, a glass vial equipped with a stir bar was charged with

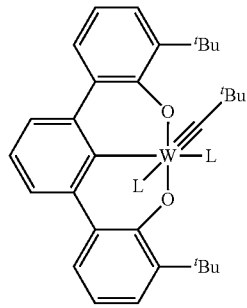

(0.171 g, 2.23×10⁻⁴ mol) in benzene-d$_6$ (2 mL) and cooled to −35° C. for 15 min. Isocyanatobenzene (24.3 µL, 2.23× 10⁻⁴ mol) was added via micropipette with stirring. As the solution warmed to ambient temperature over 10 min, a gradual change from dark red to bright red was observed. After 3 d of stirring at ambient temperature, the solvent was removed in the vacuum to yield a bright red powder. The bright red solid was dissolved in a minimal amount of benzene-d$_6$ and filtered. The filtrate was collected, dried under dynamic vacuum, and triturated with pentane to obtain 6-NPh as a bright red powder (0.148 g, 81.3%). Single crystals were obtained from a concentrated solution of 6-NPh in THF layered with pentane kept at −35° C.

$^1$H NMR (C$_6$D$_6$, 500 MHz) δ (ppm): 7.67 (d, 2H, J=7.8 Hz, Ar—H$_{38,42}$), 7.37 (d, 2H, J=7.3 Hz, Ar—H$_{5,14}$), 7.33 (d, 2H, J=7.5 Hz, Ar—H$_{3,16}$), 7.24 (t, 2H, J=7.8 Hz, Ar—H$_{39,41}$), 7.03 (m, 2H, Ar—H$_{8,10}$), 7.00 (m, 1H, Ar—Hg), 6.91 (t, 1H, J=7.5 Hz, Ar—H$_{40}$), 6.84 (dd, 2H, J=7.6 Hz, J=7.6 Hz, Ar—H$_{4,15}$), 3.28 (m, 4H, THF-H$_{33,36}$), 1.63 (s, 18H, ligand C(CH$_3$)$_3$ (H$_{20-22,24-26}$)), 1.27 (s, 9H, H$_{29-31}$), 0.92 (m, 4H, THF-H$_{34,35}$).

$^{13}$C{$^1$H} NMR (C$_6$D$_6$, 150.9 MHz) δ (ppm): 261.5 (s, W≡Cα (C$_{27}$)), 184.1 (s, W≡CCO (C$_{32}$)), 168.2 (s, C$_{1,18}$), 156.1 (s, C$_{37}$), 148.4 (s, C$_{7,11}$), 137.6 (s, C$_{2,17}$), 134.0 (s, C$_{12}$), 132.7 (s, C$_9$), 131.0 (s, C$_{6,13}$), 130.4 (s, C$_{8,10}$), 128.6 (s, C$_{39,41}$), 128.2 (s, C$_{5,14}$), 127.4 (s, C$_{38,42}$), 126.8 (s, C$_{3,16}$), 126.7 (s, C$_{40}$), 120.8 (s, C$_{4,15}$), 71.2 (s, THF-C$_{33,36}$), 44.4 (s, W≡CC(CH$_3$)$_3$ (C$_{28}$)), 35.5 (s, ligand C(CH$_3$)$_3$ (C$_{19,23}$)), 32.2 (s, W≡CC(CH$_3$)$_3$ (C$_{29-31}$)), 30.9 (s, ANC(CH$_3$)$_3$ (C$_{20-22,24-26}$)), 25.2 (s, THF-C$_{34,35}$).

Elemental Analysis calcd. (%) for C$_{42}$H$_{49}$NO$_4$W (815.70 g/mol): C, 61.844; H, 6.055; N, 1.717. Found: C, 61.251; H, 6.361; N, 1.414.

HRMS (ESI-MS) m/z: [M+H]$^+$ Calcd for C$_{42}$H$_{49}$NO$_4$W$^+$ 816.3251; Found 816.3211.

Synthesis of tungsten imido alkylidene ("6-NCy")

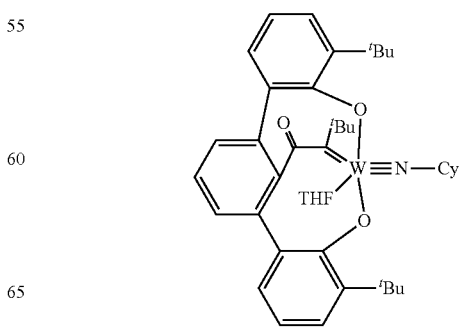

In a nitrogen-filled glovebox, a glass vial equipped with a stir bar was charged with

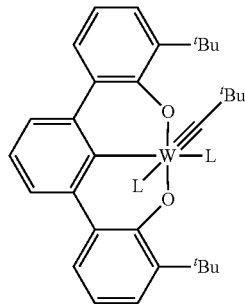

(0.109 g, 1.42×10$^{-4}$ mol) in benzene-d$_6$ (2 mL) and cooled to −35° C. for 15 min. Isocyanatocyclohexane (18.2 µL, 1.42×10$^{-4}$ mol) was added via micropipette with stirring. As the solution warmed to ambient temperature over 10 min, a gradual color change from dark red to bright orange was observed. Over the course of the reaction, a yellow-orange precipitate surfaces. After 5 d of stirring at ambient temperature, the yellow-orange precipitate was filtered and triturated with cold pentane to yield 6-NCy as a yellow powder (0.079 g, 67.5%). Single crystals were obtained by concentrating a solution of 6-NCy in benzene-d$_6$ at room temperature.

$^1$H NMR (C$_6$D$_6$, 600.2 MHz) δ (ppm): 7.36 (dd, 2H, J=7.4 Hz, J=1.5 Hz, Ar—H$_{5,14}$), 7.33 (dd, 2H, J=7.8 Hz, J=1.5 Hz, Ar—H$_{3,16}$), 7.01 (m, 2H, Ar—H$_{8,10}$), 6.97 (m, 1H, Ar—H$_9$), 6.84 (dd, 2H, J=7.6 Hz, J=7.6 Hz, Ar—H$_{4,15}$), 4.76 (tt, 1H, J=9.8 Hz, J=3.8 Hz, WNCy CH$_{37}$), 3.29 (m, 4H, THF-H$_{33,36}$), 2.37 (d, 2H, J=10.7 Hz, Cy CH(eq.)$_{38,42}$), 1.80 (m, 2H, Cy CH(eq.)$_{39,41}$), 1.75 (m, 2H, Cy CH(ax.)$_{38,42}$), 1.62 (s, 18H, ligand C(CH$_3$)$_3$ (H$_{20-22,24-26}$)), 1.46 (m, 1H, Cy CH(eq.)$_{40}$), 1.28 (s, 9H, H$_{29-31}$), 1.22 (m, 2H, Cy CH(ax.)$_{39,41}$), 1.19 (m, 1H, Cy CH(ax.)$_{40}$), 0.97 (m, 4H, THF-H$_{34,35}$).

$^{13}$C {$^1$H} NMR (C$_6$D$_6$, 150.9 MHz) δ (ppm): 258.3 (s, W=Cα (C$_{27}$)), 184.8 (s, W=CCO (C$_{32}$)), 168.2 (s, C$_{1,18}$), 148.0 (s, C$_{7,11}$), 137.4 (s, C$_{2,17}$), 134.5 (s, C$_{12}$), 132.1 (s, C$_9$), 131.3 (s, C$_{6,13}$), 130.4 (s, C$_{8,10}$), 128.4 (s, C$_{5,14}$), 126.6 (s, C$_{3,16}$), 120.4 (s, C$_{4,15}$), 74.1 (s, C$_{37}$), 71.5 (s, THF-C$_{33,36}$), 43.6 (s, W=CC(CH$_3$)$_3$ (C$_{28}$)), 36.2 (s, C$_{38,42}$), 35.5 (s, ligand C(CH$_3$)$_3$ (C$_{19,23}$)), 31.9 (s, W=CC(C$_3$)$_3$ (C$_{29-31}$)), 30.8 (s, Ar—C(CH$_3$)$_3$ (C$_{20-22,24-26}$)), 26.0 (s, C$_{40}$), 25.3 (s, THF-C$_{34,35}$), 25.2 (s, C$_{39,41}$).

Elemental Analysis calcd. (%) for C$_{42}$H$_{55}$NO$_4$W (821.75 g/mol): C, 61.389; H, 6.747; N, 1.705. Found: C, 60.850; H, 6.780; N, 1.340.

HRMS (ESI-MS) m/z: [M+H]$^+$ Calcd for C$_{38}$H$_{47}$NO$_3$W$^+$ 750.3065; Found 750.3176. Synthesis of tungsten imido-ketenylide complex[CF$_3$—ONO] W{≡N$^t$Bu}{$^t$BuC=C=O} ("13")

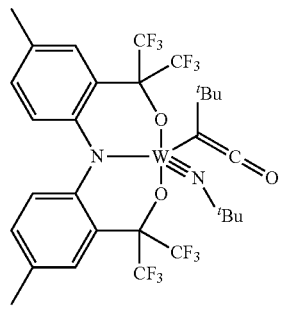

In a nitrogen-filled glove box, a 20 mL glass vial equipped with a stir bar was charged with

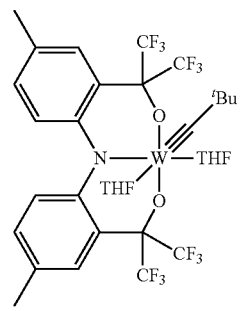

(0.052 g, 5.63×10$^{-5}$ mol) in benzene-d$_6$ and 2-isocyanato-2-methylpropane (6.43 µl, 5.63×10$^{-5}$ mol) was added via micropipette with stirring. An immediate color change from dark blue to dark green was observed upon the addition of 2-isocyanato-2-methylpropane. The reaction was allowed to stir at ambient temperature for 5 h. The solvent was evaporated under reduced pressure and triturated with pentane to yield 13 as a dark green solid (0.048 g, 97%). Single crystals amenable for X-Ray diffraction were obtained from slow diffusion of pentane into a concentrated ethereal solution of 13 at ambient temperature.

$^1$H NMR (C$_6$D$_6$, 600.2 MHz) δ (ppm): 7.61 (s, 1H, Ar—H$_{17}$), 7.60 (s, 1H, Ar—H$_7$), 6.82 (d, 1H, J=8.4 Hz, Ar—H$_{14}$), 6.76 (dd, 1H, J=8.4 Hz, J=1.4 Hz, Ar-His), 6.72 (dd, 1H, J=8.4 Hz, J=1.6 Hz, Ar—H$_5$), 6.65 (d, 1H, J=8.4 Hz, Ar—H$_4$), 1.97 (s, 3H, Ar—CH$_3$ (H$_{10}$)), 1.95 (s, 3H, Ar—CH's (H$_{20}$)), 1.19 (s, 9H, H$_{23-25}$), 1.02 (s, 9H, H$_{28-30}$).

$^{19}$F{$^1$H} NMR (C$_6$D$_6$, 564.7 MHz) δ (ppm): −70.09 (q, 3F, —CF$_3$, $^4$J=10.0 Hz), −70.73 (q, 3F, —CF$_3$, $^4$J=9.5 Hz), −75.17 (q, 3F, —CF$_3$, $^4$J=9.9 Hz), −75.64 (q, 3F, —CF$_3$, $^4$J=9.5 Hz).

$^{13}$C{$^1$H} NMR (C$_6$D$_6$, 150.9 MHz) δ (ppm): 180.8 (s, WC$_\alpha$=C$_\beta$=O (C$_{26}$)), 147.5 (s, C$_3$), 147.0 (s, C$_{13}$), 133.1 (s, C$_{16}$), 132.3 (s, C$_{15}$), 131.8 (s, C$_5$), 130.9 (s, C$_6$), 128.3 (s, C$_{12}$), 127.4 (s, C$_{14}$), 127.1 (s, C$_{17}$), 126.9 (s, C$_{21}$), 126.3 (s, C$_7$), 123.6 (s, C$_4$), 121.5 (s, C$_2$), 83.3 (s, C'(CF$_3$)$_2$(C$_1$)), 82.2 (s, C(CF$_3$)$_2$ (C$_{11}$)), 76.2 (s, C$_{27}$), 37.7 (s, C$_{22}$), 30.4 (s, C$_{23}$-25), 29.3 (s, C$_{28-30}$), 20.4 (s, Ar'—CH$_3$ (C$_{20}$)), 20.1 (s, Ar—CH$_3$ (C$_{10}$)).

Elemental Analysis calcd. (%) for C$_{30}$H$_{30}$F$_{12}$N$_2$O$_3$W (878.40 g/mol): C, 41.021; H, 3.443; N, 3.189. Found: C, 42.017; H, 3.781; N, 2.092. Found: C, 42.215; H, 3.915; N, 2.440.

Synthesis of the tungsten ketenylide [$^t$BuOCO]W{≡N$^t$Bu}{$^t$BuC=C=O} ("14-$^t$Bu")

Equilibrium Between 14-$^t$Bu and 6-N$^t$Bu

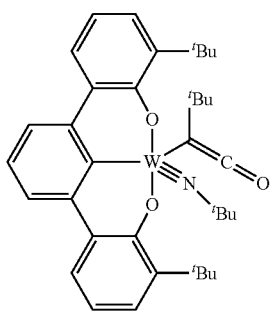

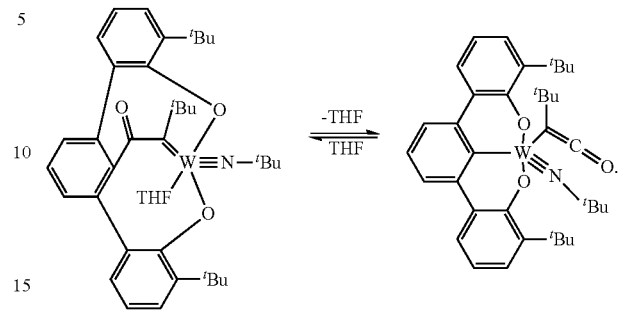

In a nitrogen-filled glovebox, a 50 mL Schlenk flask equipped with a stir bar was charged with 6-N$^t$Bu (0.145 g, $1.82 \times 10^{-4}$ mol) in 15 mL of toluene. The reaction flask was taken outside of the glovebox and connected to a Schlenk line using a rubber tubing. The rubber tubing was purged multiple times before opening the reaction flask to argon; upon completion, the reaction flask was placed in a preheated oil bath at 90° C. for an hour under a positive pressure of argon. Vacuum was applied for a short interval to shift the equilibrium towards the product by the elimination of a THF molecule. The process was repeated for nine more cycles for one hour each to ensure >99% elimination of THF molecule from the coordination sphere of 6-N$^t$Bu. A color change from scarlet to dark red upon removal of the THF molecule was observed. Upon completion, the remaining solvent was removed under vacuum at 90° C. for an additional hour. The reaction flask was transferred to the glovebox, and the product was redissolved in a minimal amount of toluene and filtered. The solvent was removed in vacuum and triturated with pentane to yield 14-$^t$Bu as a dark red solid (0.100 g, 75.8%).

$^1$H NMR (C$_7$D$_8$, 600.2 MHz) δ (ppm): 7.88 (d, 2H, J=7.8 Hz, Ar—H$_{8,10}$), 7.69 (dd, 2H, J=7.8 Hz, J=1.5 Hz, Ar—H$_{5,14}$), 7.38 (dd, 2H, J=7.7 Hz, J=1.6 Hz, Ar—H$_{3,16}$), 7.35 (m, 1H, Ar—H$_9$), 6.97 (dd, 2H, J=7.8 Hz, J=7.8 Hz, Ar—H$_{4,15}$), 1.60 (s, 18H, ligand C(CH$_3$)$_3$ (H$_{20\text{-}22,24\text{-}26}$)), 1.06 (s, 9H, H$_{29\text{-}31}$), 0.81 (s, 9H, H$_{34\text{-}36}$).

$^{13}$C{$^1$H} NMR (C$_7$D$_8$, 150.9 MHz) δ (ppm): 187.0 (s, C$_{12}$), 181.7 (s, WC$_\alpha$=C$_\beta$=O (C$_{32}$)), 156.8 (s, C$_{1,18}$), 140.0 (s, C$_{7,11}$), 136.9 (s, C$_{2,17}$), 131.9 (s, C$_{6,13}$), 129.5 (s, C$_9$), 126.9 (s, C$_{8,10}$, $_{125.9}$ (s, C$_{3,16}$), 125.6 (s, C$_{6,14}$), 121.2 (s, C$_{4,16}$), 98.9 (s, C$_{27}$), 75.1 (s, C$_{33}$), 36.7 (s, C$_{28}$), 34.9 (s, ligand C(CH$_3$)$_3$ (C$_{19,23}$)), 32.0 (s, C$_{29\text{-}31}$), 30.5 (s, Ar—C(CH$_3$)$_3$ (C$_{20\text{-}22,24\text{-}26}$)), 29.9 (s, C$_{34\text{-}36}$).

In a nitrogen filled glovebox, a J-Young NMR tube was charged with complex 14-$^t$Bu (0.024 g, $3.36 \times 10^{-5}$ mol) in 0.8 mL of toluene-d$_8$. THF (2.86 μl, $3.53 \times 10^{-5}$ mol) was added in one shot into the J-Young tube and mixed well before taking the NMR spectra. An instantaneous color change was observed from dark red to scarlet upon addition of the THF, indicated the formation of complex 6-N$^t$Bu.

Example 2—Polymerization

Polymerization of Norbornene by Catalyst 6-N$^t$Bu

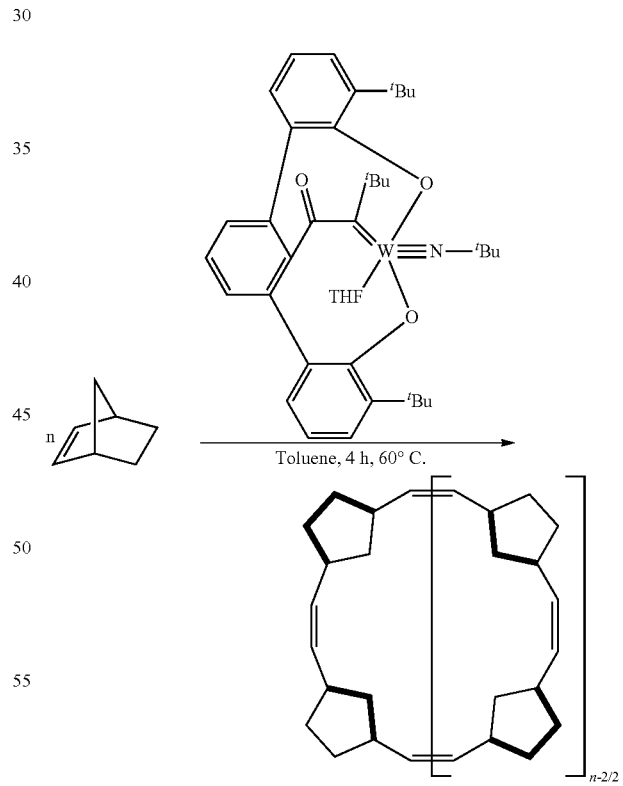

In a nitrogen-filled glovebox, a stock solution was prepared from 6-N$^t$Bu (30.0 mg) in toluene (3 mL). A 20 mL scintillation vial was then charged with norbornene (50.0 mg, $5.31 \times 10^{-4}$ mol, 100 equiv) in 1.70 mL of toluene. A volume of 0.423 mL of 6-N$^t$Bu (4.23 mg, $5.31 \times 10^{-6}$ mol, 1 equiv) stock solution was added to the vigorously stirred norbornene solution and the reaction was allowed to stir for 4 h at 60° C. After this period, the reaction vessel was brought outside the glovebox, and the reaction mixture was added dropwise to stirring methanol. Polynorbornene precipitates as a white solid, and was filtered and dried overnight under vacuum (33.6 mg, 67.2% yield, >95% cis, >97% syndiotactic). $^1$H and $^{13}$C NMR spectral assignments are consistent with literature reports (Grubbs et al., J. Am. Chem. Soc. 2013, 135, 10032-10035). The polymerization reactions were done with different monomer/catalyst ratios as seen in Table 1.

Complex 6-N$^t$Bu is an active catalyst for the stereoselective REMP of norbornene to give cyclic polynorbornene (Table 1). Treating a solution of norbornene (1:100) in toluene with 6-N$^t$Bu (0.25 mol %) for 4 h at 60° C. results in the formation of cyclic polynorbornene in 67% yield, with high cis-selectivity. $^1$H and $^{13}$C NMR spectra are consistent with cis-syndiotactic polynorbornene (>95% cis, >97% syndiotactic).

TABLE 1

| [monomer/catalyst]$_0$ | [monomer]$_0$$^b$ | average yield$^c$ (%) | % cis$^d$ |
|---|---|---|---|
| 50:1 | 0.25 | 75.0 | 95 |
| 100:1 | 0.25 | 67.2 | 95 |
| 200:1 | 0.25 | 41.9 | 94 |
| 400:1 | 0.25 | 27.2 | 95 |

$^a$The appropriate amount of 10 mg/mL solution of catalyst dissolved in toluene is added to 50 mg of norbornene dissolved in toluene and stirred for 4 h at 60° C..
$^b$mol L$^{-1}$.
$^c$Determined gravimetrically.
$^d$Determined by $^1$H NMR spectroscopy.

Polymerization of Norbornene by Catalyst 6-NCy scintillation vial was then charged with norbornene (70.0 mg, 7.43×10$^{-4}$ mol, 100 equiv) in 1.75 mL of toluene. A volume of 1.222 mL of 6-NCy (6.11 mg, 7.43×10$^{-6}$ mol, 1 equiv) stock solution was added to the vigorously stirred norbornene solution and the reaction was allowed to stir for 10 h at 60° C. After this period, the reaction vessel was brought outside the glovebox, and the reaction mixture was added dropwise to stirring methanol. Polynorbornene precipitates as a white solid, and was filtered and dried overnight under vacuum (14.7 mg, 19.5% yield, >82% cis, syndiotactic). $^1$H and $^{13}$C NMR spectral assignments are consistent with previous reports (Grubbs et al., J. Am. Chem. Soc. 2013, 135, 10032-10035). The polymerization reactions were done with different monomer/catalyst ratios as seen in Table 2.

TABLE 2

| [monomer/catalyst]$_0$ | [monomer]$_0$$^b$ | average yield$^c$ (%) | % Cis$^d$ |
|---|---|---|---|
| 50:1 | 0.25 | 40.4 | 77 |
| 100:1 | 0.25 | 19.5 | 82 |
| 200:1 | 0.25 | 9.62 | 78 |
| 400:1 | 0.25 | 9.00 | 59 |

$^a$The appropriate amount of 10 mg/mL solution of catalyst dissolved in toluene is added to 70 mg of norbornene dissolved in toluene and stirred for 10 h at 60° C..
$^b$mol L$^{-1}$.
$^c$Determined gravimetrically.
$^d$Determined by $^1$H NMR spectroscopy.

Polymerization of Norbornene by Catalyst 6-NPh

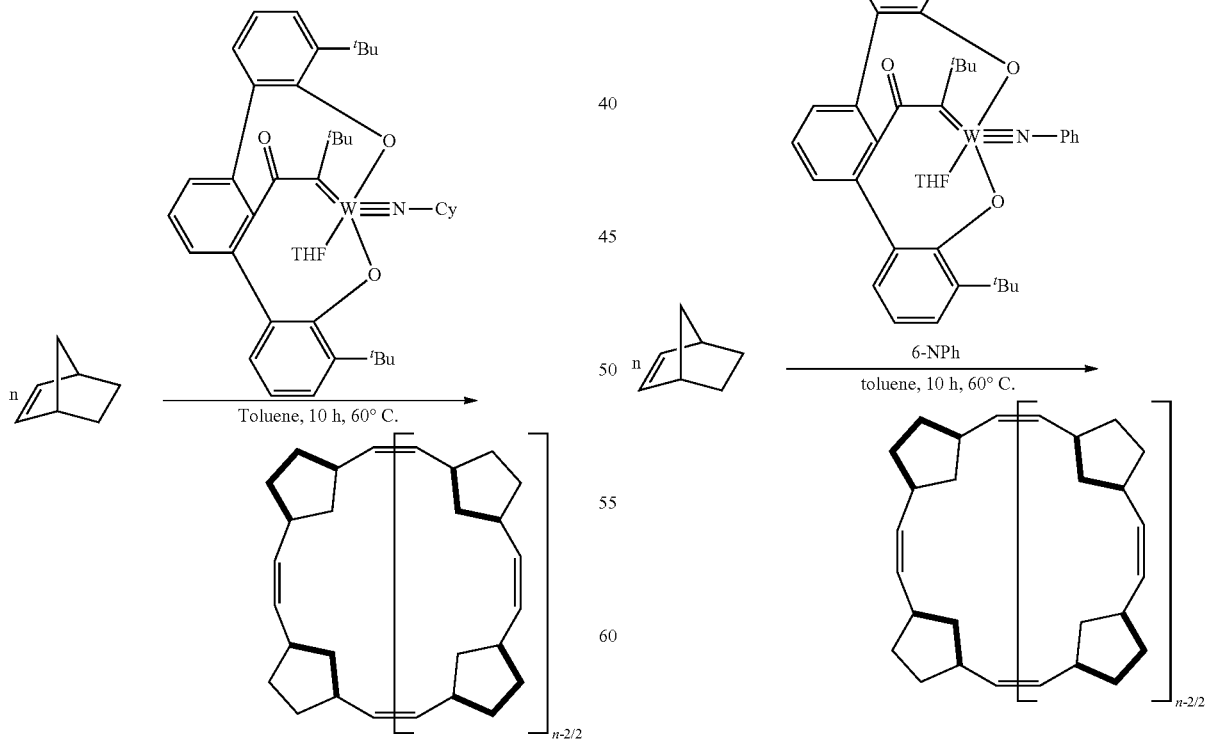

In a nitrogen-filled glovebox, a stock solution was prepared from 6-NCy (30.0 mg) in toluene (6 mL). A 20 mL scintillation vial was then charged with norbornene (70.0

In a nitrogen-filled glovebox, a stock solution was prepared from 6-NPh (30.0 mg) in toluene (3 mL). A 20 mL scintillation vial was then charged with norbornene (70.0 mg, 7.43×10⁻⁴ mol, 100 equiv) in 2.37 mL of toluene. A volume of 0.606 mL of 6-NPh (6.06 mg, 7.43×10⁻⁶ mol, 1 equiv) stock solution was added to the vigorously stirred norbornene solution and the reaction was allowed to stir for 10 h at 60° C. After this period, the reaction vessel was brought outside the glovebox, and the reaction mixture was added dropwise to stirring methanol. Polynorbornene precipitates as a white solid, and was filtered and dried overnight under vacuum (14.7 mg, 21.0% yield, >86% cis, syndiotactic). $^1$H and $^{13}$C NMR spectral assignments are consistent with previous reports (Grubbs et al., *J. Am. Chem. Soc.* 2013, 135, 10032-10035). The polymerization reactions were done with different monomer/catalyst ratios, as seen in Table 3 and Table 4.

TABLE 3

| [monomer/catalyst]$_0$ | [monomer]$_0$$^b$ | average yield$^c$ (%) | % cis$^d$ |
|---|---|---|---|
| 50:1 | 0.25 | 28.7 | 87 |
| 100:1 | 0.25 | 21.0 | 86 |
| 200:1 | 0.25 | 12.3 | 85 |
| 400:1 | 0.25 | 7.33 | 85 |

$^a$The appropriate amount of 10 mg/mL solution of catalyst dissolved in toluene is added to 70 mg of norbornene dissolved in toluene and stirred for 10 h at 60° C..
$^b$mol L$^{-1}$.
$^c$Determined gravimetrically.
$^d$Determined by $^1$H NMR spectroscopy.

TABLE 4

| [monomer/catalyst]$_0$ | [monomer]$_0$$^b$ | yield (%) | % cis$^c$ | M$_n$$^d$ (kDa) | M$_w$/M$_n$$^d$ |
|---|---|---|---|---|---|
| 63:1 | 0.1 | 90 | 94 | 185 | 1.55 |
| 100:1 | 0.1 | 89 | 92 | 384 | 1.31 |
| 171:1 | 0.1 | 80 | 93 | 167 | 1.20 |
| 400:1 | 0.1 | 76 | 92 | 178 | 1.34 |

$^a$The appropriate amount of 10 mg/mL solution of catalyst dissolved in toluene and is added to an appropriate amount of norbornene dissolved in toluene (1 mL) and stirred for 10 h at 60° C..
$^b$mol L$^{-1}$.
$^c$Determined by $^1$H NMR spectroscopy.
$^d$Determined by size exclusion chromatography equipped with multi-angle light scattering.

Complex 6-NPh is also an active catalyst for the stereoselective REMP of norbornene to give cyclic polynorbornene. $^1$H and $^{13}$C NMR spectra are consistent with cis-syndiotactic polynorbornene. Size exclusion chromatography (SEC) equipped with multi-angle light scattering (MALS) and viscosity detectors provide data for a cyclic topology. Cyclic polymers have lower intrinsic viscosities and smaller hydrodynamic volumes than their linear analogs. For comparison, linear polynorbornene with high cis selectivity (>95%) and syndiotacticity (>95%) was synthesized using Grubbs' catalyst Ru(NHC(Ad)(Mes))(=CH(PhO$^i$Pr))(η$^2$-NO$_3$) (15), as described in the comparative example below.

Polymerization of Norbornene by Catalyst 11-$^t$Bu

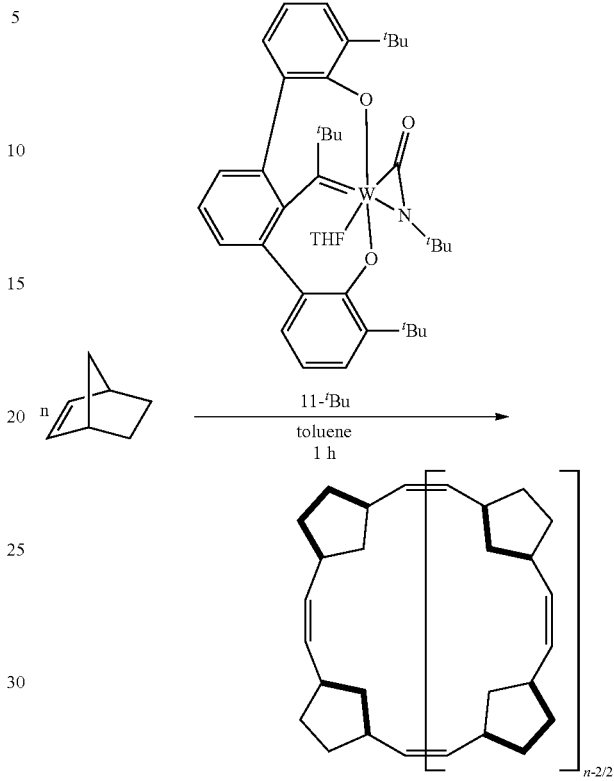

In a nitrogen-filled glovebox, a stock solution was prepared with 11-$^t$Bu (30.0 mg) in toluene (3 mL). A 20 mL scintillation vial was then charged with norbornene (50.0 mg, 5.31×10⁻⁴ mol, 400 equiv) in 2.02 mL of toluene. A volume of 0.106 mL of 11-$^t$Bu (1.06 mg, 1.33×10⁻⁶ mol, 1 equiv) stock solution was added to the vigorously stirred norbornene solution and the reaction was allowed to stir for 1 h at ambient temperature. After this period, the reaction vessel was brought outside the glovebox, and the reaction mixture was added dropwise to stirring methanol. Polynorbornene precipitates as a white solid, and was filtered and dried overnight under vacuum (31.9 mg, 63.8% yield, >99% cis, >99% syndiotactic). $^1$H and $^{13}$C NMR spectral assignments are consistent with previous reports(Grubbs et al., *J. Am. Chem. Soc.* 2013, 135, 10032-10035). The polymerization reactions were done with different monomer/catalyst ratios as seen in Table 5.

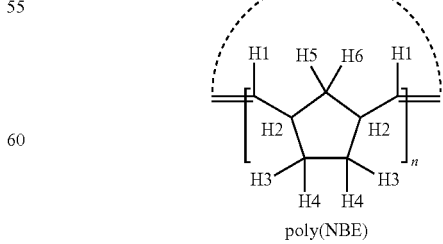

poly(NBE)

$^1$H NMR of cis, syndiotactic poly(NBE) (CDCl$_3$, 600.2 MHz, 25° C.): δ 5.22 (m, 2H, H$^1$), 2.80 (m, 2H, H$^2$), 1.90

(dt, J=13.0 Hz, J=6.80 Hz, 1H, H⁵), 1.80 (m, 2H, H³), 1.37 (m, 2H, H⁴), 1.02 (dt, J=12.3 Hz, J=10.2 Hz, 1H, H⁶).

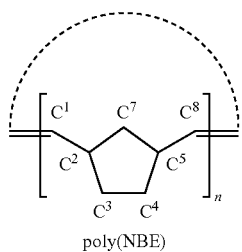

poly(NBE)

$^{13}C\{^1H\}$ NMR of cis, syndiotactic poly(NBE) (CDCl₃, 150.9 MHz, 25° C.): δ 134.0 (C$^{1,6}$), 42.9 (C⁷), 38.8 (C$^{2,5}$), 33.4 (C$^{3,4}$).

FTIR: 2999, 2942, 2863 cm⁻¹ (C—H stretch); 1724, 1701, 1653 cm⁻¹ (C=C stretch), 1405 cm⁻¹ (cis in-plane=C—H bending), 957 cm⁻¹ (trans out of plane=C—H bending), 732 cm⁻¹ (cis out of plane=C—H bending).

TABLE 5

| [monomer/catalyst]₀ | [monomer]₀[b] | average yield[c] (%) | % cis[d] |
|---|---|---|---|
| 50:1 | 0.25 | 94.9 | 99 |
| 100:1 | 0.25 | 92.9 | 99 |
| 200:1 | 0.25 | 79.6 | 99 |
| 400:1 | 0.25 | 63.8 | 99 |

[a]The appropriate amount of 10 mg/mL solution of catalyst dissolved in toluene is added to 50 mg of norbornene dissolved in toluene and stirred for 1 h at ambient temperature.
[b]mol L⁻¹.
[c]Determined gravimetrically.
[d]Determined by ¹H NMR spectroscopy.

Considering the additional strain in the tethered alkylidene of complex 11-$^t$Bu relative to 6-NR (R=$^t$Bu, Ph and Cy), 11-$^t$Bu was tested for its activity in the REMP of norbornene and was found to be more active and more selective. Treating 11-$^t$Bu with norbornene in toluene at ambient temperature yields cis-selective cyclic polynorbornene after one hour (>99% by ¹H NMR spectroscopy) (Table 5). Adding the reaction mixture into a ten-fold excess of stirring methanol stops the polymerization and precipitates the polymer. Vacuum filtration followed by drying under vacuum overnight affords white cyclic polynorbornene. Cyclic polynorbornene produced with catalyst 11-$^t$Bu is syndiotactic (>99%), as determined by comparison to $^{13}C\{^1H\}$ NMR data of previously reported syndiotactic linear polynorbornene. Post-polymerization modification of polynorbornene via partial bromination of double bonds, as reported by Schrock et al., Macromolecules 2015, 48, 3148-3152, confirms the syndiotacticity of the cyclic polynorbornene. The brominated polymer displays two doublets at 3.84 ppm (J=9.6 Hz) and 3.81 ppm (J=9.6 Hz). Concordant with reported cis, syndiotactic linear polynorbornene, irradiating the methine proton at 2.61 ppm results in two singlets. In addition, the FTIR spectrum of the cyclic polynorbornene exhibits a strong IR absorption at 732 cm⁻¹ (cis out of plane=C—H bending) and a weak absorption at 1405 cm⁻¹ (cis in-plane=C—H bending) characteristic of cis olefins.

Upon comparing the polymerization activity of 6-N$^t$Bu relative to 11-$^t$Bu; 11-$^t$Bu was found to be more active and selective, likely due to additional strain on the tethered alkylidene and greater lability of THF. Finally, comparing the polymers produced by catalyst 6-NR and 11-$^t$Bu against cis and syndiotactic linear analogs permits their conclusive assignment as cyclic polymers. Pure tacticity in polymers imparts important materials properties. The catalyst herein were capable of catalyzing polymerization to form cyclic polymers with >99% syndiotacticity and >99% cis double bonds.

Comparative Example 1

Figure 2:
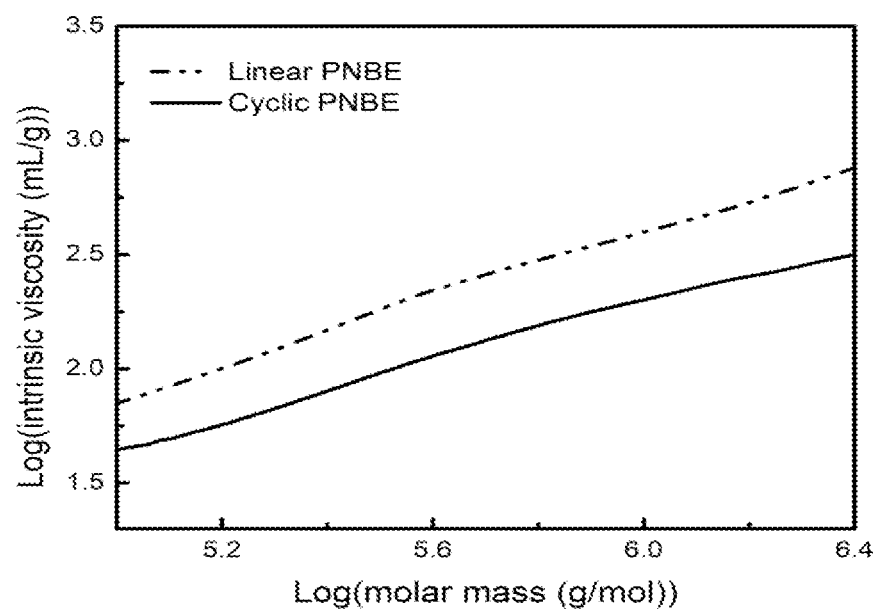
FIG. 2 depicts a graph of the Log of [η] versus Log of $M_w$ for cyclic poly(norbornene) synthesized by 6-NPh and linear poly(norbornene) synthesized by 15.
Figure 3:
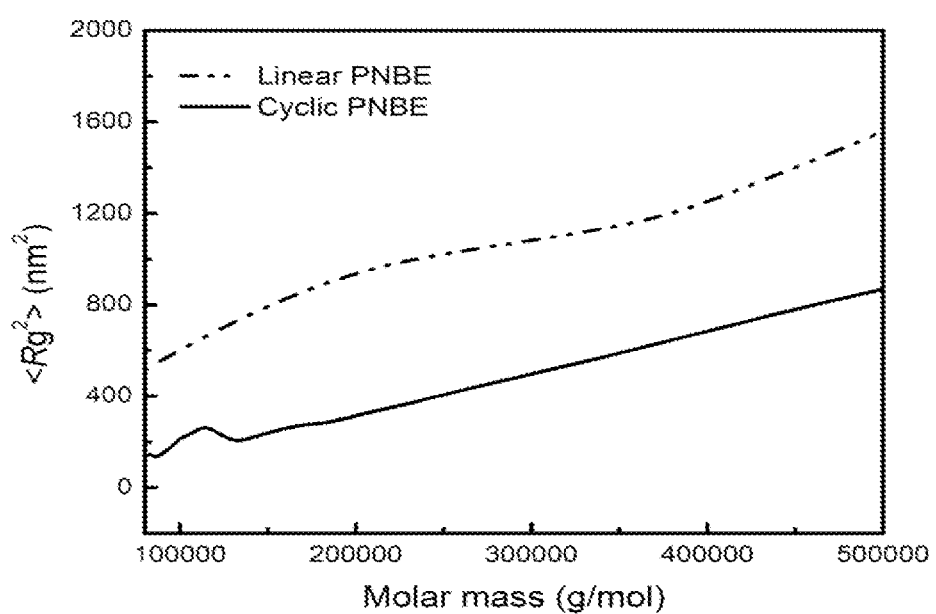
FIG. 3 depicts a graph of the mean square radius ($<R_g^2>$) versus $M_w$ for cyclic poly(norbornene) synthesized by 6-NPh and linear poly(norbornene) by 15.

Cyclic polymers have lower intrinsic viscosities and smaller hydrodynamic volumes than their linear analogs. Linear polynorbornene with high cis (>95%) and syndiotacticity (>95%) was synthesized using Grubbs' catalyst Ru(NHC(Ad)(Mes))(=CH(PhO$^i$Pr))(η²-NO₃) (15) A) Grubbs et al., J. Am. Chem. Soc. 2012, 134, 2040-2043; B) Grubbs et al., J. Am. Chem. Soc. 2016, 138, 1394-1405). Consistent with their smaller hydrodynamic volumes, a plot of log of molar mass versus elution volume (FIG. 1) indicated that the cyclic polynorbornene samples with the same molar mass eluted later than their linear counterparts. Confirmation of a cyclic topology also came from a demonstration of their lower intrinsic viscosities relative to the linear polymers via a Mark-Houwink-Sakurada (MHS) plot (log [η] versus log M, where [η] is the intrinsic viscosity and M is the viscosity-average molar mass (FIG. 2). The experimental ratio $[η]_{cyclic}/[η]_{linear}$ of 0.78 over a range of molecular weights is within the limits expected for the topological difference. The ratio using early predictions and under theta conditions (a=0.5) was expected to be ~0.65 (Fukatsu et al., J. Chem. Phys. 1966, 44, 4539) while recent predictions suggest a ratio of 0.58±0.01 (Rubio et al., Macromolecules 1995, 28, 2240-2246). Experimental results were inconsistent, ranging from ~0.5-~0.8, depending on molecular weight, as well as polymer-solvent systems. For the polymers synthesized with catalysts 6-NPh and 15, MHS parameter a values of 0.788 and 0.700 indicated both polymers behave as flexible random coils in solution, meaning the observed differences are caused by different behavior of the polymers in solution. In addition a plot of mean square radius of gyration ($<R_g^2>$) versus molar mass (FIG. 3) obtained for cyclic and linear samples of polynorbornene provides a $<R_g^2>_{cyclic}/<R_g^2>_{linear}$ ratio of 0.484±0.1, which is within the experimental error of the theoretical value of 0.5 (Semlyen, J. A., Cyclic polymers. 2nd ed.; Kluwer Academic Publishers: Dordrecht; Boston, 2000).

What is claimed is:
1. A catalyst having a structure represented by formula (I), formula (II), or formula (III):

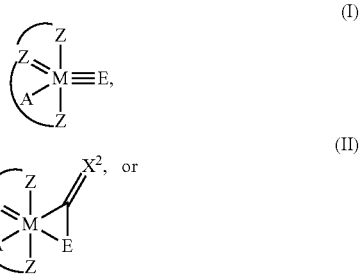

-continued

(III)

wherein

M is a transition metal;

A is selected from the group consisting of $NH_3$, $N(R^3)_3$, $Ar^1$, $C_{1-6}$ hydroxyalkyl, $R^3OR^3$, $P(R^3)_3$, $R^3CHO$, $R^3COR^3$, $R^3COOR^3$, and $S(R^3)_2$, each $R^3$ is independently $C_1$-$C_{22}$ alkyl, $C_5$-$C_8$ cycloalkyl, $Ar^1$, or two $R^3$, together with the atoms to which they are attached, form a five- to eight-membered heterocycle;

L is a ketene;

E is $NR^4$ or S, wherein $R^4$ is $C_1$-$C_{22}$ alkyl, $C_5$-$C_8$ cycloalkyl, $Ar^1$;

Z-Z-Z comprises a tridentate ligand having a structure of

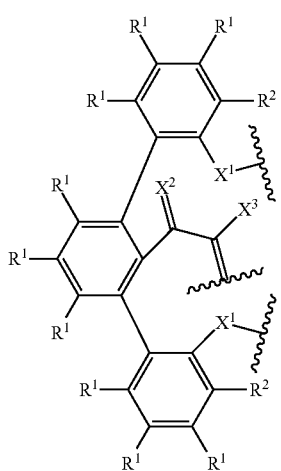

when the catalyst has a structure of formula (I),

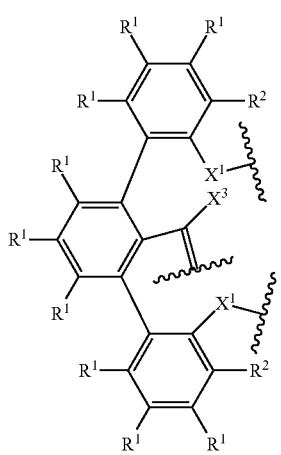

when the catalyst has a structure of formula (II),

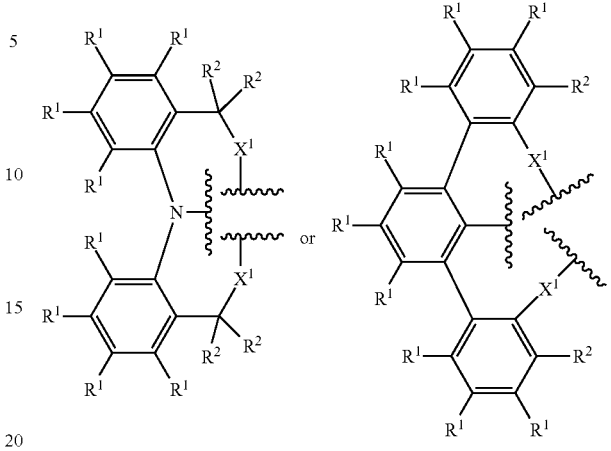

when the catalyst has a structure of formula (III);

each $X^1$ is independently O, $NR^5$, or S, and $R^5$ is $C_1$-$C_{22}$alkyl, $C_5$-$C_8$cycloalkyl, or $Ar^1$;

$X^2$ is O, $NR^6$, or S, and $R^6$ is $C_1$-$C_{22}$ alkyl, $C_5$-$C_8$cycloalkyl, or $Ar^1$;

each $R^1$ is independently selected from H, $C_1$-$C_{22}$ alkyl, $C_5$-$C_8$cycloalkyl, carboxyl, ester, amino, thiol, halo, $C_1$-$C_{22}$ haloalkyl, and OH, or two adjacent $R^1$, together with the carbon atoms to which they are attached, can form a five- to eight-membered cyclic group;

each $R^2$ is independently selected from H, $Ar^1$, $C_1$-$C_{22}$ alkyl, $C_5$-$C_8$cycloalkyl, halo, $C_1$-$C_{22}$ haloalkyl, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —O—($C_1$-$C_{22}$ alkyl), and $(R^2)_3$—Si—;

$X^3$ is selected from $Ar^1$, $C_1$-$C_{22}$ alkyl, $C_5$-$C_8$cycloalkyl, $C_1$-$C_{22}$ haloalkyl, and H; and each $Ar^1$ is independently selected from $C_6$-$C_{22}$ aryl or a 5-12 membered heteroaryl comprising from 1 to 3 ring heteroatoms selected from O, N, and S;

with the proviso that in Formula (I), when E is S, then $X^2$ is not O or S.

2. The catalyst of claim 1, wherein M comprises a group 6 transition metal.

3. The catalyst of claim 1, wherein the catalyst has the structure of formula (I) and Z-Z-Z is

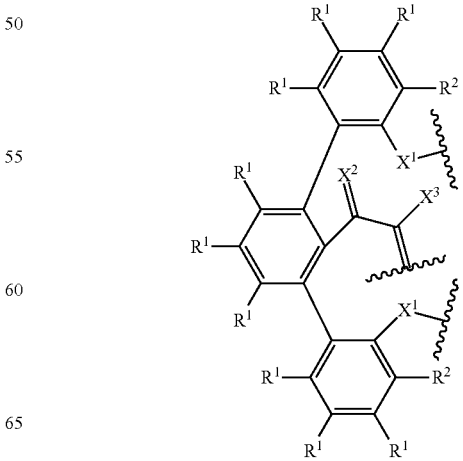

or wherein the catalyst has the structure of formula (II) and Z-Z-Z is

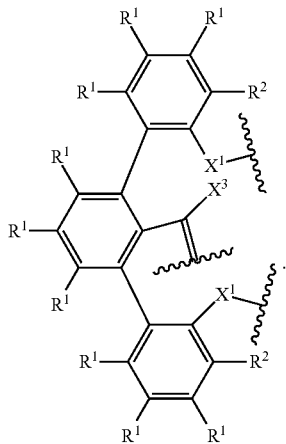

4. The catalyst of claim 1, wherein the catalyst has the structure of formula (III) and Z-Z-Z is

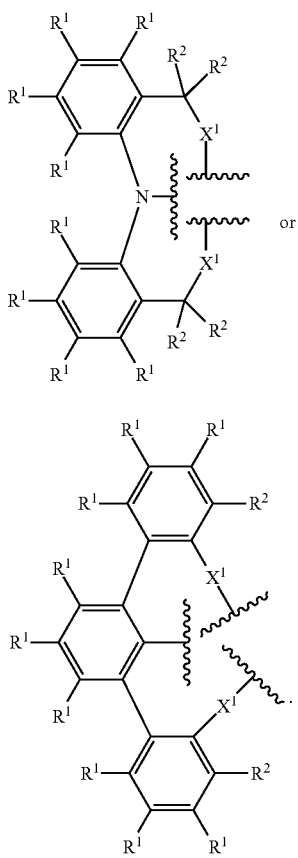

5. The catalyst of claim 1, wherein A is $N(R^3)_3$, $P(R^3)_3$, $Ar^1$, $S(R^3)_2$ or $R^3OR^3$.

6. The catalyst of claim 1, having a structure:

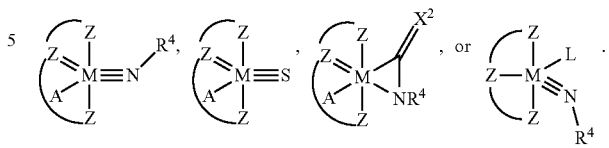

7. The catalyst of claim 1, wherein at least one $X^1$ comprises O.

8. The catalyst of claim 1, wherein each $R^1$ comprises H.

9. The catalyst of claim 1, wherein at least one $R^1$ comprises a $C_1$-$C_6$ alkyl.

10. The catalyst of claim 1, wherein at least one $R^2$ comprises H, methyl, ethyl, propyl, butyl, pentyl, hexyl, naphthyl, cyclohexyl, $C_1$-$C_{22}$ haloalkyl, or $C_6$-$C_{22}$ aryl.

11. The catalyst of claim 1, wherein $X^3$ comprises H, methyl, ethyl, propyl, butyl, pentyl, hexyl, naphthyl, cyclohexyl, or $C_6$-$C_{22}$ aryl.

12. The catalyst of claim 1, selected from the group consisting of

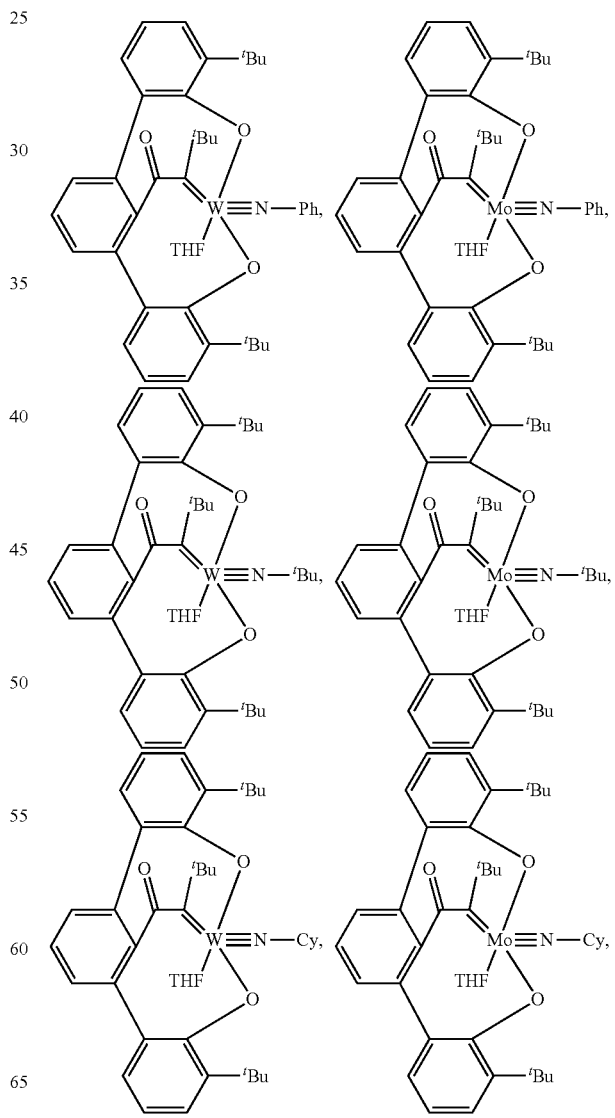

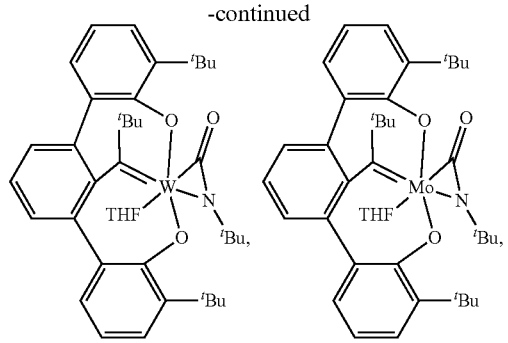
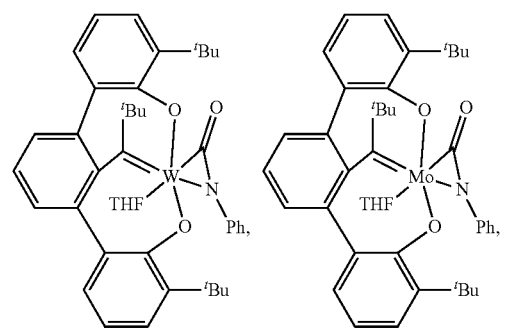
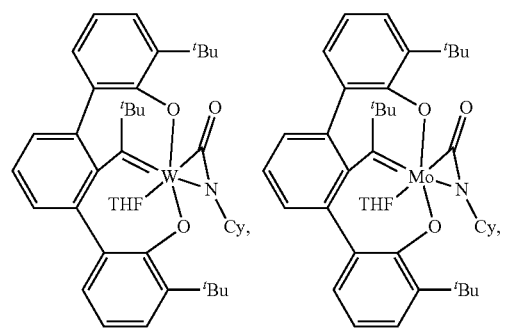
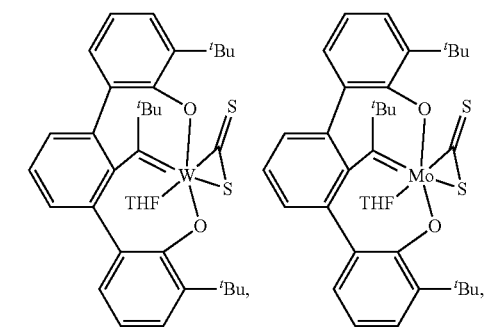
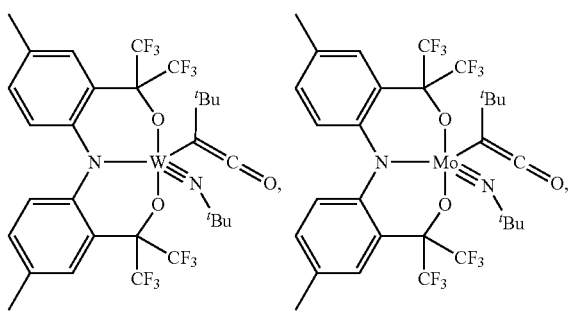
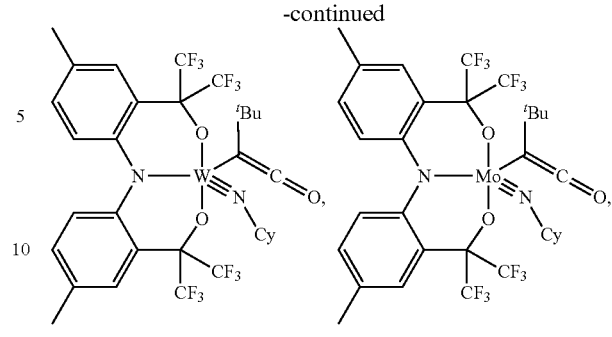
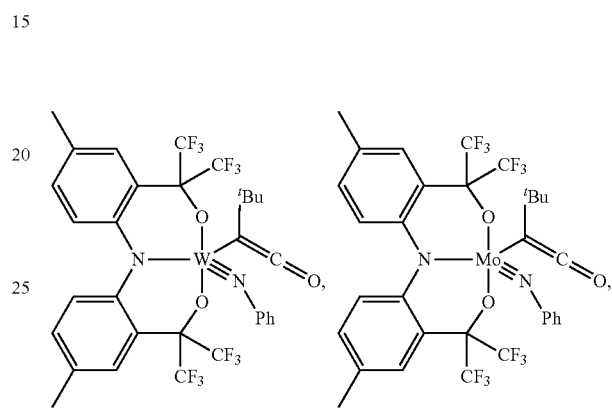
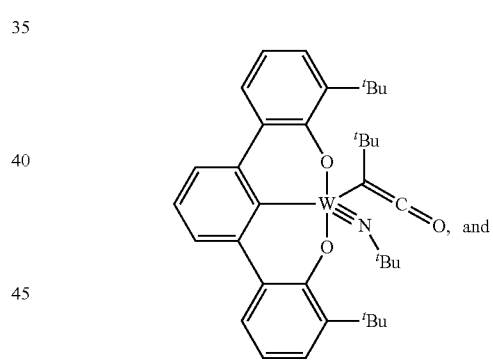
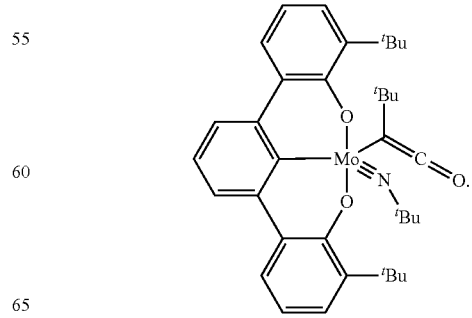

13. A method for making the catalyst of claim 1, comprising
reacting a complex of formula (IV) or formula (VI) and CS₂ or an isocyanate having a structure of formula (V) under conditions sufficient to form the catalyst:

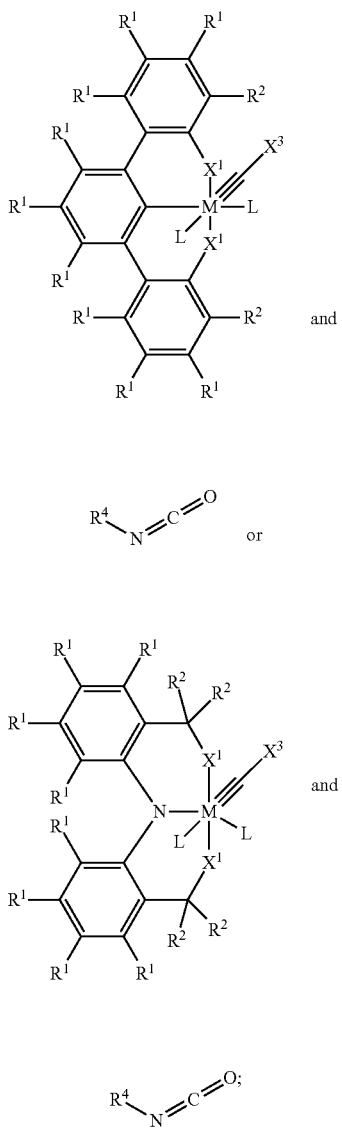

wherein
each L is independently absent or selected from phosphine, phosphite, phosphonite, phosphinite, amine, amide, imine, alkoxy, ether, thioether, and a five- or six-membered monocyclic group having 1 to 3 ring heteroatoms;
or both L together comprise a bidentate ligand.

14. The method of claim 13, wherein the complex of formula (IV) has a structure represented by a formula:

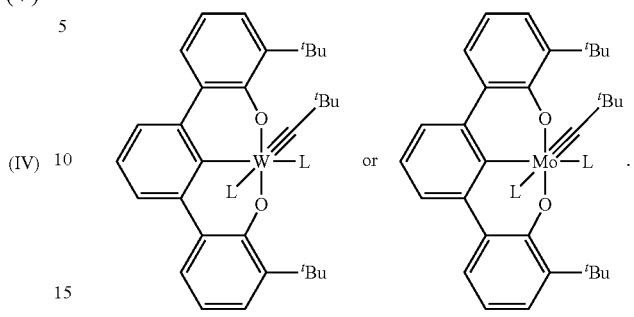

15. The method of claim 13, wherein the complex of formula (VI) has a structure represented by a formula:

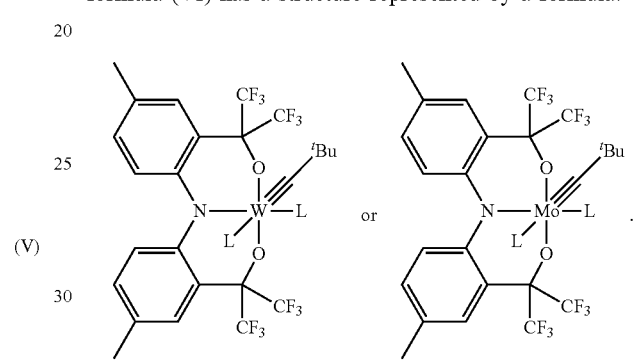

16. The method of claim 13, wherein at least one L is absent, phosphine, amine, ether, or a five- or six-membered monocyclic group having 1 to 3 heteroatoms.

17. The method of claim 13, wherein both L together comprise a bidentate ligand.

18. A method of preparing a cyclic polymer, comprising:
admixing a plurality of alkenes in the presence of the catalyst of formula (I) or formula (II) of claim 1 under conditions sufficient to polymerize the plurality of alkenes, thereby forming the cyclic polymer, wherein the cyclic polymer ring comprises alkene groups.

19. The method of claim 18, wherein the plurality of alkenes are cyclic alkenes comprising unsubstituted or substituted cyclopropene, cyclobutene, cyclopentene, cycloheptene, cyclooctene, norbornene, dicyclopentadiene, norbornene anhydride, diester from norbornene anhydride, imide from norbornene anhydride, oxanorbornene, oxanorbornene anhydride, ester of oxanorbornene anhydride, and imide of oxanorbornene anhydride, or combinations thereof, wherein the ester is from a $C_1$-$C_{10}$ alkyl or aryl alcohol, the imide is from $C_1$-$C_{10}$ alkyl or aryl amine; wherein substituents are $C_1$-$C_{10}$ alkyl, aryl, $C_1$-$C_{10}$ alkoxy, aryloxy, $C_1$-$C_{10}$ carboxylic acid ester, or carboxylic acid amide, optionally substituted one or two times with $C_1$-$C_{10}$ alkyl or aryl.

20. The method of claim 18, further comprising hydrogenating the cyclic polymer alkene groups to form cyclic polymer alkane groups.

* * * * *

UNITED STATES PATENT AND TRADEMARK OFFICE
CERTIFICATE OF CORRECTION

PATENT NO. : 12,209,162 B2
APPLICATION NO. : 17/607522
DATED : January 28, 2025
INVENTOR(S) : Adam S. Veige et al.

Page 1 of 2

It is certified that error appears in the above-identified patent and that said Letters Patent is hereby corrected as shown below:

In the Claims

Column 44, Lines 5-18, Claim 1, " 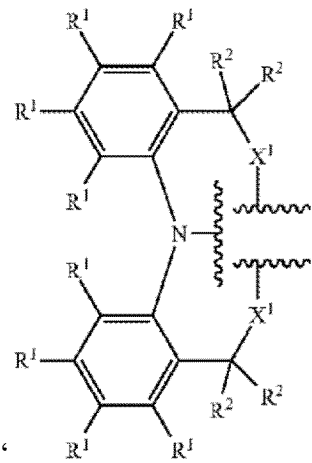 " should be -- 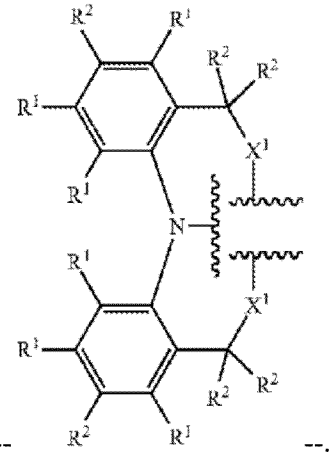 --.

Column 45, Lines 31-44, Claim 4, " 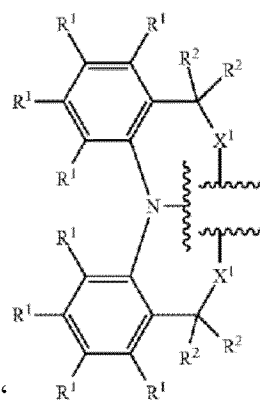 " should be -- 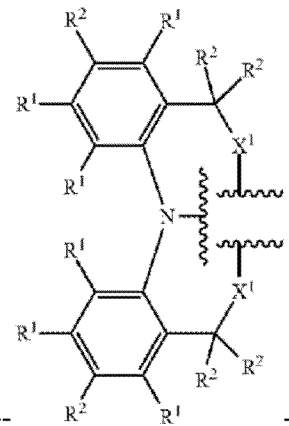 --.

Column 49, Lines 1-2, Claim 13, "comprising" should be -- comprising: --.

Signed and Sealed this
Twenty-seventh Day of May, 2025

Coke Morgan Stewart
*Acting Director of the United States Patent and Trademark Office*

CERTIFICATE OF CORRECTION (continued)
U.S. Pat. No. 12,209,162 B2

Column 49, Lines 34-47, Claim 13, " 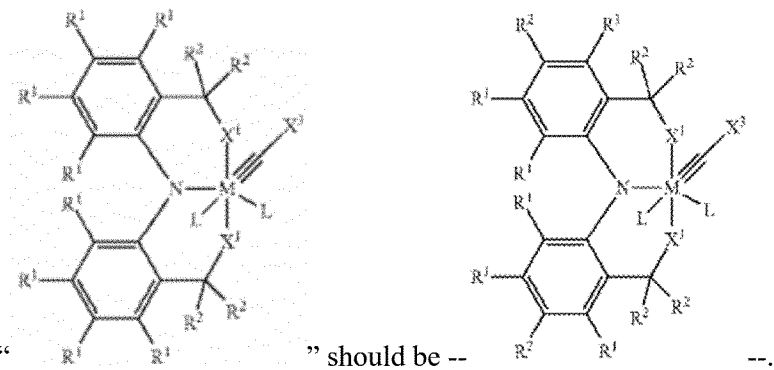 " should be -- --.

Column 50, Lines 5-16, Claim 14, " 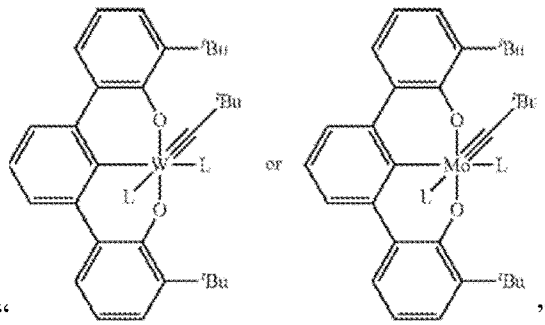 " should be 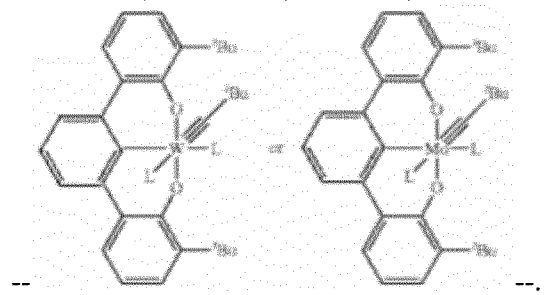 --.